US011835544B2

(12) United States Patent
Haneda

(10) Patent No.: US 11,835,544 B2
(45) Date of Patent: Dec. 5, 2023

(54) WIND SPEED MEASURING DEVICE AND WIND SPEED MEASURING METHOD

(71) Applicant: SONY SEMICONDUCTOR SOLUTIONS CORPORATION, Kanagawa (JP)

(72) Inventor: Naoya Haneda, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 352 days.

(21) Appl. No.: 17/250,650

(22) PCT Filed: Aug. 16, 2019

(86) PCT No.: PCT/JP2019/032118
§ 371 (c)(1),
(2) Date: Feb. 16, 2021

(87) PCT Pub. No.: WO2020/045120
PCT Pub. Date: Mar. 5, 2020

(65) Prior Publication Data
US 2021/0181230 A1    Jun. 17, 2021

(30) Foreign Application Priority Data

Aug. 27, 2018  (JP) .................................. 2018-158160

(51) Int. Cl.
*G01P 5/24* (2006.01)
(52) U.S. Cl.
CPC .................................... *G01P 5/245* (2013.01)
(58) Field of Classification Search
None
See application file for complete search history.

(56) References Cited

U.S. PATENT DOCUMENTS 6,424,408 B1 *  7/2002  Ooga ........................ G01P 5/26
                                                            342/36
8,452,023 B2 *  5/2013  Petit ........................ H04R 3/02
                                                            381/71.8
10,816,337 B2 * 10/2020  Shimaji ................. G01B 21/22

FOREIGN PATENT DOCUMENTS

JP    57-77965 A    5/1982
JP    61-77765 A    4/1986
(Continued)

OTHER PUBLICATIONS

International Search Report and Written Opinion of PCT Application No. PCT/JP2019/032118, dated Oct. 29, 2019, 09 pages of ISRWO.

*Primary Examiner* — Peter J Macchiarolo
*Assistant Examiner* — Jermaine L Jenkins
(74) *Attorney, Agent, or Firm* — CHIP LAW GROUP

(57) ABSTRACT

Realized is a device capable of measuring a wind speed and a wind direction with high precision while reducing the effect of ambient noise. The device includes an acoustic wave transmitting section that transmits a measurement acoustic wave, an acoustic wave receiving section that receives the measurement acoustic wave transmitted from the acoustic wave transmitting section, a signal selecting section that determines a characteristic of the measurement acoustic wave, and a wind speed calculating section that calculates a wind speed by analyzing a signal received by the acoustic wave receiving section. The signal selecting section selects, as the measurement acoustic wave, an acoustic wave that includes a low-intensity frequency bandwidth selected from a noise signal which the acoustic wave receiving section receives when the measurement acoustic wave is not transmitted.

17 Claims, 15 Drawing Sheets

(56) References Cited

FOREIGN PATENT DOCUMENTS

| | | |
|---|---|---|
| JP | 05-240954 A | 9/1993 |
| JP | 2000-206133 A | 7/2000 |
| JP | 2005-241441 A | 9/2005 |
| WO | WO-2015059866 A1 * | 4/2015 ............ G01M 9/065 |

* cited by examiner

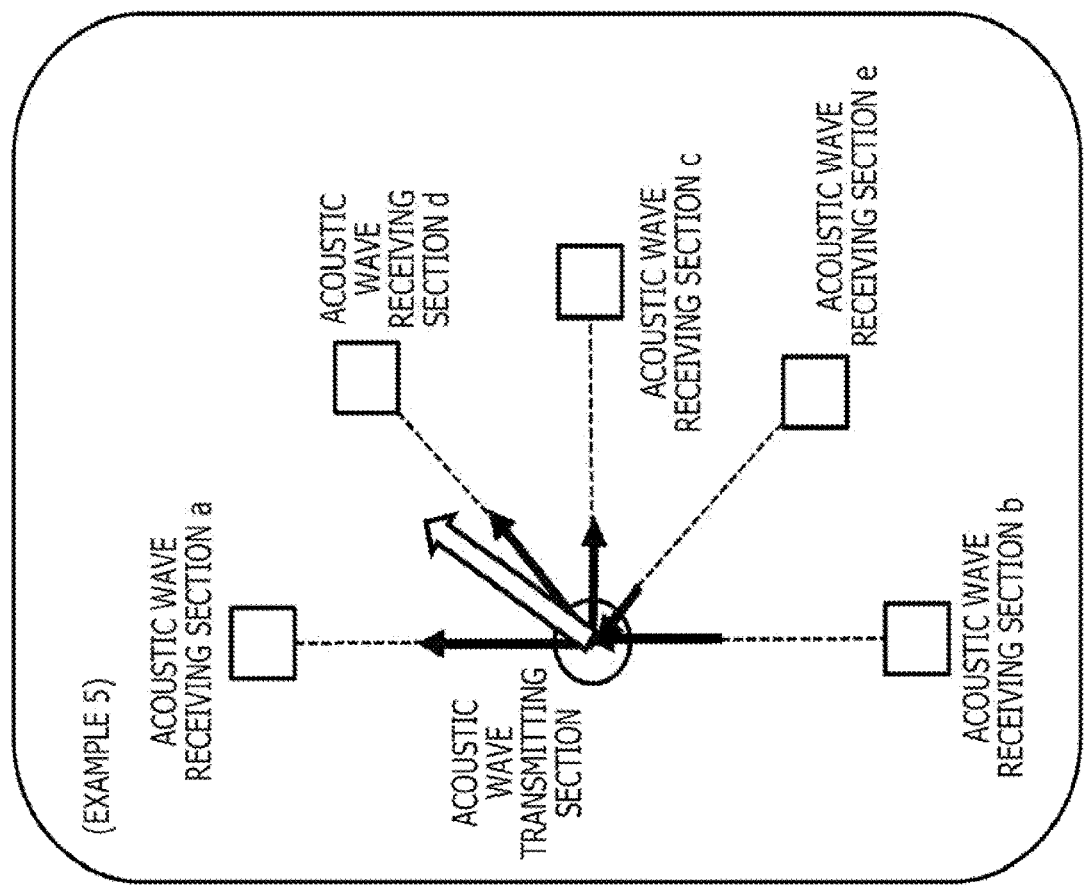
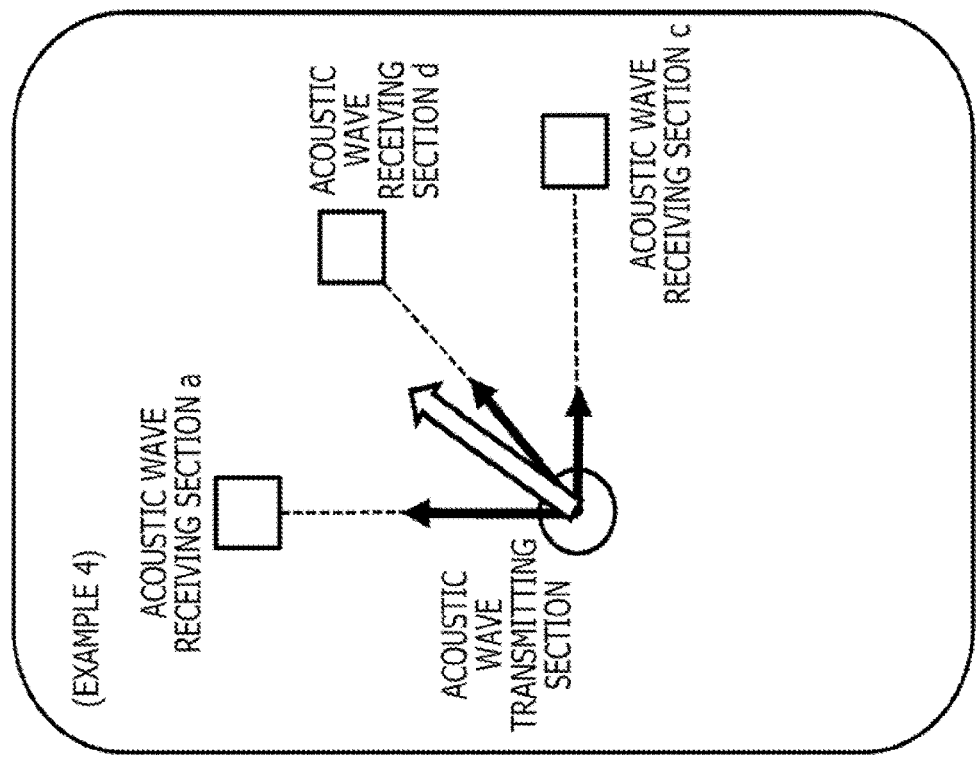
FIG. 7

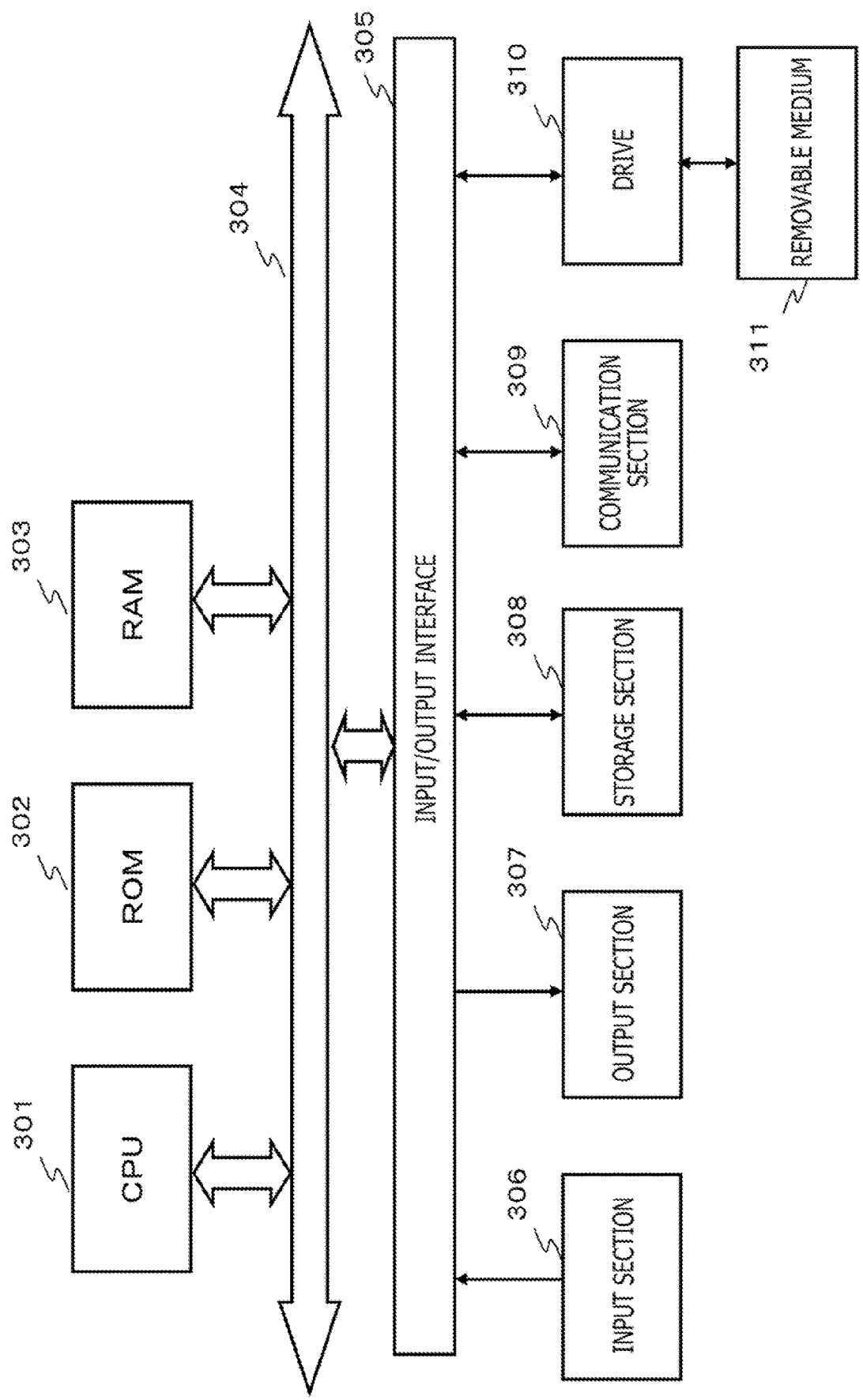

WIND SPEED MEASURING DEVICE AND WIND SPEED MEASURING METHOD

CROSS REFERENCE TO RELATED APPLICATIONS

This application is a U.S. National Phase of International Patent Application No. PCT/JP2019/032118 filed on Aug. 16, 2019, which claims priority benefit of Japanese Patent Application No. JP 2018-158160 filed in the Japan Patent Office on Aug. 27, 2018. Each of the above-referenced applications is hereby incorporated herein by reference in its entirety.

TECHNICAL FIELD

The present disclosure relates to a wind speed measuring device, a wind speed measuring method, and a program. More specifically, the present disclosure relates to a wind speed measuring device, a wind speed measuring method, and a program for detecting a wind speed and a wind direction by using acoustic waves.

BACKGROUND ART

For example, windmill-type devices are often used as devices for detecting wind speeds and wind directions. However, there have been a problem that a windmill-type device is difficult to be downsized because of having a movable part, and a problem that a windmill-type device has difficulty to carry out precise measurement in a case where a wind speed is high or low.

In order to solve such problems, there has been a wind speed-and-wind direction measuring device that uses acoustic waves and ultrasonic waves.

For example, PTL 1 (JP Sho 57-077965A) discloses a configuration in which ultrasonic wave transmitters and ultrasonic wave receivers are arranged at fixed intervals Lx and Ly respectively in an X axis and a Y axis which are orthogonal to each other on the upper part of a vehicle body so that respective propagation times Tx and Ty are measured to measure the wind speeds in the respective axis directions, and the measured wind speeds are combined to measure a wind speed.

However, such a wind speed-and-wind direction measuring device that uses acoustic waves or ultrasonic waves has a problem that the measurement accuracy is deteriorated due to the effect of noise sounds based on ambient noise, vibration noise, or the like.

CITATION LIST

Patent Literature

[PTL 1]
JP Sho 57-077965A

SUMMARY

Technical Problem

The present disclosure has been made in view of the above problems, for example, and an object thereof is to provide a wind speed measuring device, a wind speed measuring method, and a program by which a wind speed and a wind direction can be precisely detected even under an environment including a noise sound based on ambient noise, vibration noise, or the like.

Solution to Problem

A first aspect of the present disclosure is a wind speed measuring device including
an acoustic wave transmitting section that transmits a measurement acoustic wave,
an acoustic wave receiving section that receives the measurement acoustic wave transmitted from the acoustic wave transmitting section,
a signal selecting section that determines a characteristic of the measurement acoustic wave outputted from the acoustic wave transmitting section, and
a wind speed calculating section that calculates a wind speed by analyzing a signal received by the acoustic wave receiving section, in which
the signal selecting section selects, as the measurement acoustic wave outputted from the acoustic wave transmitting section, an acoustic wave that mainly includes a low-intensity frequency bandwidth selected from a noise signal which the acoustic wave receiving section receives when the measurement acoustic wave is not transmitted.

Furthermore, a second aspect of the present disclosure is a wind speed measuring method which is executed by a wind speed measuring device. The method includes
a signal selecting step in which a signal selecting section determines a characteristic of a measurement acoustic wave outputted from an acoustic wave transmitting section,
a step in which the acoustic wave transmitting section transmits the measurement acoustic wave,
a step in which an acoustic wave receiving section receives the measurement acoustic wave transmitted from the acoustic wave transmitting section, and
a step in which a wind speed calculating section calculates a wind speed by analyzing a signal received by the acoustic wave receiving section, in which
in the signal selecting step,
an acoustic wave is selected as the measurement acoustic wave outputted from the acoustic wave transmitting section, the acoustic wave mainly including a low-intensity frequency bandwidth selected from a noise signal which the acoustic wave receiving section receives when the measurement acoustic wave is not transmitted.

Furthermore, a third aspect of the present disclosure is a program for causing a wind speed measuring device to execute a wind speed measuring process. The program causes the wind speed measuring device to execute
a signal selecting step of causing a signal selecting section to determine a characteristic of a measurement acoustic wave outputted from an acoustic wave transmitting section,
a step of causing the acoustic wave transmitting section to transmit the measurement acoustic wave;
a step of causing an acoustic wave receiving section to receive the measurement acoustic wave transmitted from the acoustic wave transmitting section, and
a step of causing a wind speed calculating section to calculate a wind speed by analyzing a signal received by the acoustic wave receiving section, in which
in the signal selecting step,
an acoustic wave is selected as the measurement acoustic wave outputted from the acoustic wave transmitting section, the acoustic wave mainly including a low-intensity frequency bandwidth selected from a noise signal which the acoustic wave receiving section receives when the measurement acoustic wave is not transmitted.

It is to be noted that the program according to the present disclosure can be provided by a storage medium or communication medium for providing the program in a computer readable format to an information processing device or computer system that is capable of executing various program codes, for example. By providing such a program in a computer readable format, processes according to the program are executed in the information processing device or the computer system.

Other objects, features, and advantages of the present disclosure will become apparent from more detailed description based on embodiments and attached drawings which are described later. It is to be noted that, in the present description, a system refers to a logical set configuration including a plurality of devices, and the devices of the configuration are not necessarily included in the same casing.

Advantageous Effects of Invention

According to a configuration of one embodiment of the present disclosure, a device capable of measuring a wind speed and a wind direction with high precision while reducing the effect of ambient noise is realized.

Specifically, for example, the device includes an acoustic wave transmitting section that transmits a measurement acoustic wave, an acoustic wave receiving section that receives the measurement acoustic wave transmitted from the acoustic wave transmitting section, a signal selecting section that determines a characteristic of the measurement acoustic wave, and a wind speed calculating section that calculates a wind speed by analyzing a signal received by the acoustic wave receiving section. The signal selecting section selects, as the measurement acoustic wave, an acoustic wave that mainly includes a low-intensity frequency bandwidth selected from a noise signal which the acoustic wave receiving section receives when the measurement acoustic wave is not transmitted. Further, the plural acoustic wave receiving sections are disposed at different relative positions with respect to the acoustic wave transmitting section, and the wind speed calculating section functions as a wind direction-and-wind speed calculating section to calculate a wind direction as well as a wind speed by analyzing signals received by the respective plural acoustic wave receiving sections.

With this configuration, a device capable of measuring a wind speed and a wind direction with high precision while reducing the effect of ambient noise is realized.

It is to be noted that the effects disclosed in the present description are merely examples and are not necessarily limitative. Any other additional effects may be further provided.

BRIEF DESCRIPTION OF DRAWINGS

FIG. 7 is a diagram for explaining other arrangement examples of the acoustic wave receiving sections in the wind direction-and-wind speed measuring device according to the present disclosure.

FIG. 15 is a diagram depicting a hardware configuration example of a device that can be adopted as the wind speed measuring device according to the present disclosure.

DESCRIPTION OF EMBODIMENTS

Hereinafter, a wind speed measuring device, a wind speed measuring method, and a program according to the present disclosure will be explained in detail with reference to the drawings. It is to be noted that the explanation will be given according to the following items.

1. Configuration and Processes in First Embodiment of Wind Speed Measuring Device According to Present Disclosure
2. Configuration and Processes in Second Embodiment of Wind Speed Measuring Device According to Present Disclosure
3. Process of Selecting Measurement Acoustic Wave
4. Configuration and Processes of Wind Direction-and-Wind Speed Measuring Device That Is Mounted on Mobile Body
5. Configuration Example of Measuring Wind Direction and Wind Speed in 3D Space
6. Hardware Configuration Example of Wind Speed Measuring Device
7. Conclusion of Configurations According to Present Disclosure

[1. Configuration and Processes in First Embodiment of Wind Speed Measuring Device According to Present Disclosure]

First, a configuration and processes in a first embodiment of a wind speed measuring device according to the present disclosure will be explained.

Figure 1:
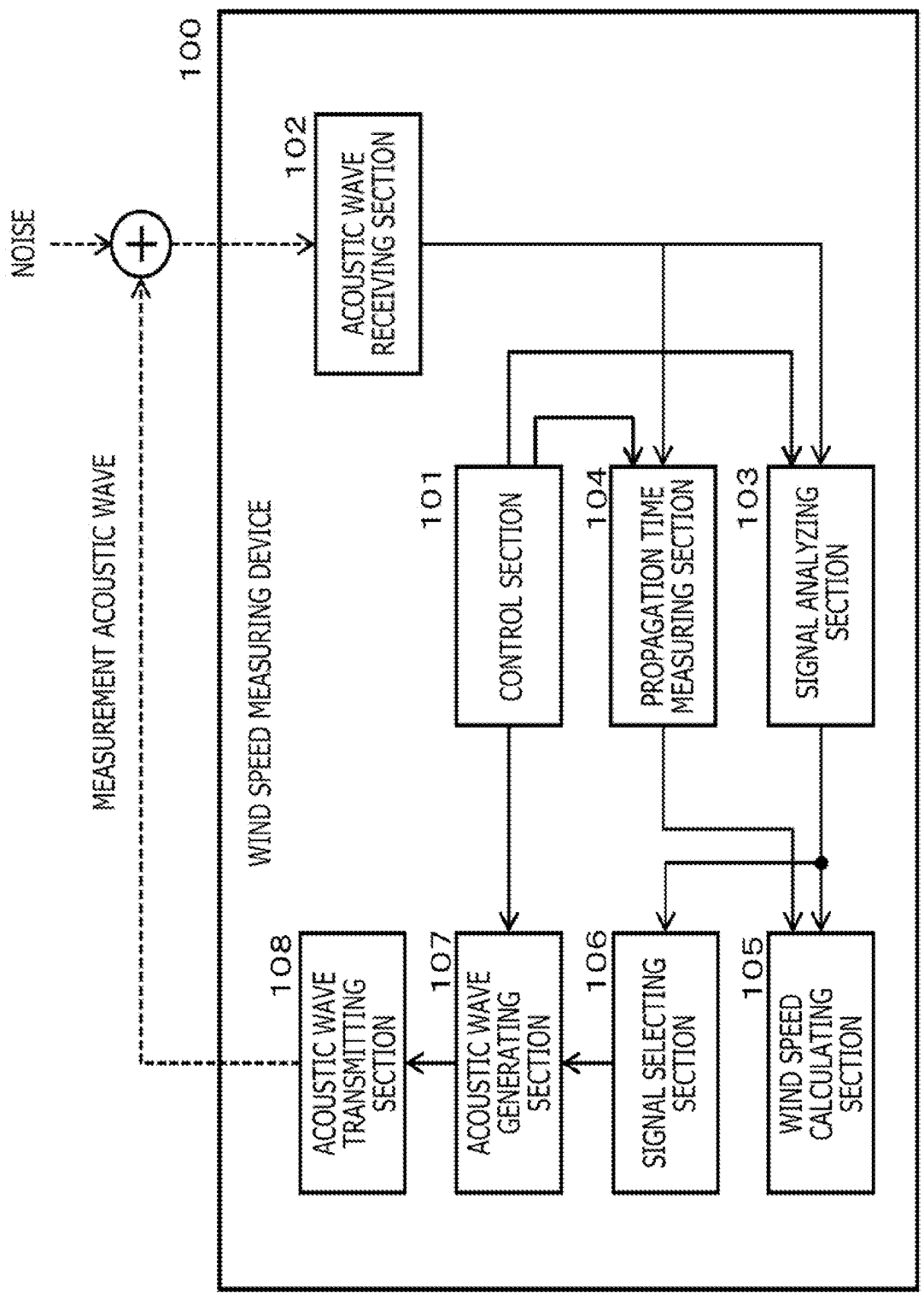
FIG. 1 is an explanatory diagram of a configuration example of a wind speed measuring device according to the present disclosure.

FIG. 1 is a block diagram depicting a configuration of the first embodiment of a wind speed measuring device 100 according to the present disclosure.

As depicted in FIG. 1, the wind speed measuring device 100 includes a control section 101, an acoustic wave receiving section 102, a signal analyzing section 103, a propagation time measuring section 104, a wind speed calculating section 105, a signal selecting section 106, an acoustic wave generating section 107, and an acoustic wave transmitting section 108.

The acoustic wave receiving section 102 and the acoustic wave transmitting section 108 are located to be spaced from each other by a predetermined distance. The spaced distance is previously measured.

A time that is taken until an acoustic wave (measurement acoustic wave) transmitted from the acoustic wave transmitting section 108 is received by the acoustic wave receiving section 102, that is, a propagation time varies depending on the flow of air between the acoustic wave transmitting section 108 and the acoustic wave receiving section 102, that is, depending on a wind speed. Further, the frequency also varies depending on the wind speed.

The wind speed measuring device 100 depicted in FIG. 1 calculates a wind speed by measuring at least either the propagation time or variation of the frequency. It is to be noted that a wind speed in the direction of a straight line connecting the acoustic wave transmitting section 108 to the acoustic wave receiving section 102 is calculated.

However, not only a measurement acoustic wave that is transmitted from the acoustic wave transmitting section 108 in order to measure a wind speed, but also ambient noise, that is, noise is inputted to the acoustic wave receiving section 102. Presence of the noise increases the likelihood of occurrence of an error in a result of wind speed analysis. That is, a wind speed cannot be measured with high precision.

In order to solve this problem, in the wind speed measuring device 100 depicted in FIG. 1, noise which the acoustic wave receiving section 102 receives while no measurement acoustic wave is outputted from the acoustic wave transmitting section 108 is first analyzed. That is, the signal components of the noise are analyzed, and a low-intensity (level) signal component (frequency component) is selected from among the signal components (frequency components) of the noise. Further, a measurement acoustic wave signal having the selected frequency component is generated and is outputted through the acoustic wave transmitting section 108.

As a result of these processes, the acoustic wave transmitting section 108 outputs a measurement acoustic wave signal having a frequency bandwidth that is substantially not included in noise. An acoustic wave signal having this frequency bandwidth is selected from among signals inputted from the acoustic wave receiving section 102, and a propagation time and a frequency variation thereof are calculated. Accordingly, a wind speed can be measured with high precision while a measurement error that is caused by noise is reduced.

Specific processes which are executed by the wind speed measuring device 100 depicted in FIG. 1 will be explained. The wind speed measuring device 100 depicted in FIG. 1 executes the following two processes.

(Process 1) Analysis of noise
(Process 2) Analysis of a wind speed
Hereinafter, these processes will be explained in order.
(Process 1) Analysis of Noise
First, analysis of noise will be explained.

The acoustic wave receiving section 102 of the wind speed measuring device 100 depicted in FIG. 1 performs A/D conversion of a sound received while no acoustic wave is transmitted from the acoustic wave transmitting section 108, that is, performs A/D conversion of noise, and transmits the converted noise to the signal analyzing section 103.

The signal analyzing section 103 performs signal processing such as FFT (fast Fourier transform) to analyze the frequency spectrum and the signal level of the noise and reports the result of the analysis to the signal selecting section 106. The signal selecting section 106 determines a measurement acoustic wave characteristic on the basis of the noise analysis result and reports the characteristic to the acoustic wave generating section 107.

That is, the signal selecting section 106 determines, as the measurement acoustic wave characteristic, a low-intensity (level) signal component (frequency component) among the signal components (frequency components) of the noise, causes the acoustic wave generating section 107 to generate a measurement acoustic wave signal having the determined frequency component, and outputs the measurement acoustic wave signal through the acoustic wave transmitting section 108.

Figure 2:
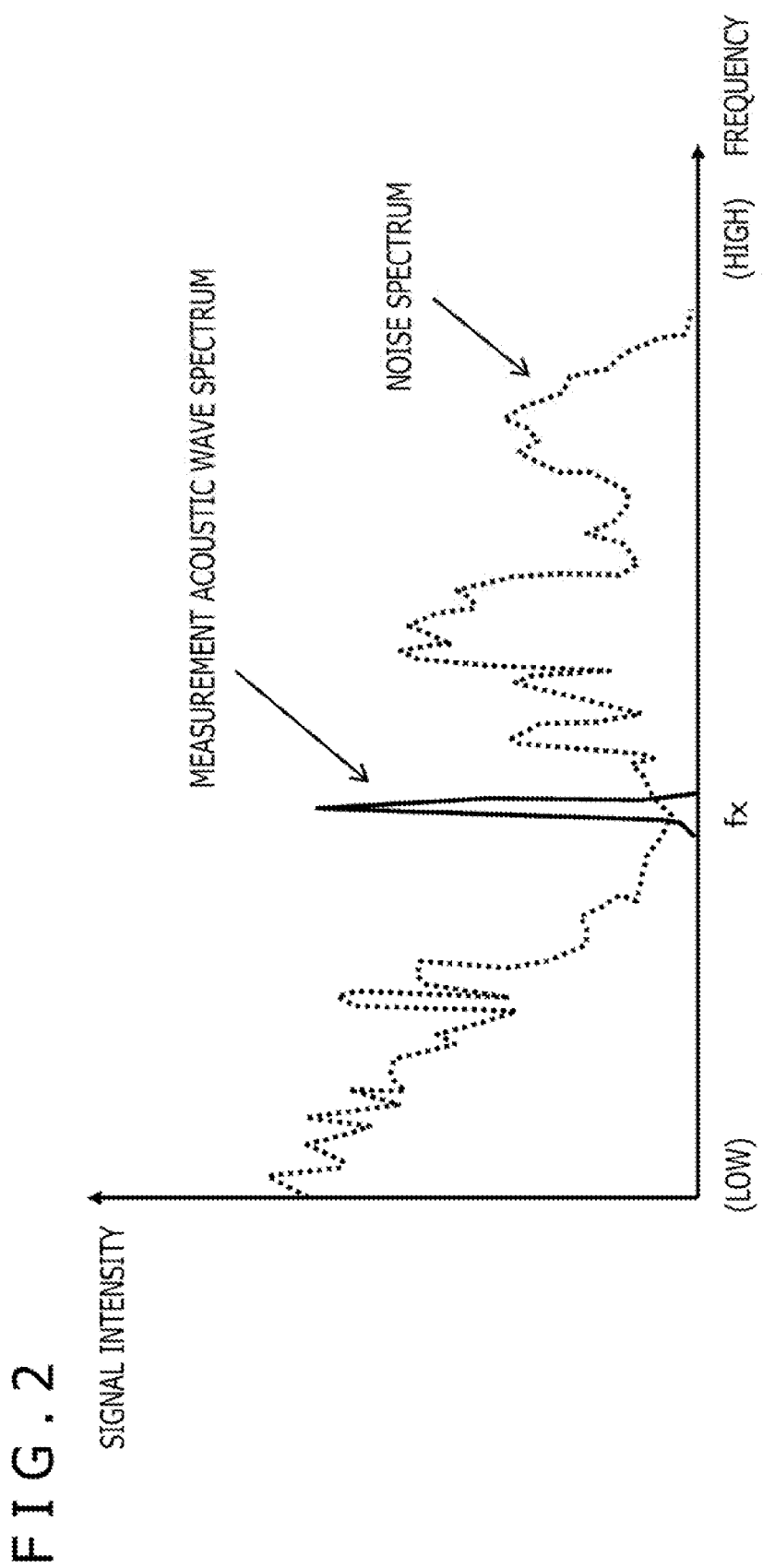
FIG. 2 is an explanatory diagram of one example of a measurement acoustic wave that is outputted by the wind speed measuring device according to the present disclosure.

A specific process example will be explained with reference to FIG. 2. FIG. 2 depicts a noise analysis result (noise spectrum) obtained by the signal analyzing section 103. The horizontal axis indicates a frequency. The vertical axis indicates a signal intensity. The frequency components of noise include various frequency components ranging from a low frequency to a high frequency. However, the level of the signal intensity varies without being uniform over the frequencies. It can be seen that, in particular, a frequency (fx) depicted in FIG. 2 is a frequency bandwidth at which the signal intensity is significantly low.

The signal selecting section 106 determines, as the measurement acoustic wave characteristic, a low-intensity (level) frequency component (fx) among the signal components (frequency components) of noise, as explained above, causes the acoustic wave generating section 107 to generate a measurement acoustic wave signal mainly including the determined frequency component, and outputs the measurement acoustic wave signal through the acoustic wave transmitting section 108.

It is to be noted that information regarding the measurement acoustic wave signal characteristic (e.g., the frequency fx) selected by the signal selecting section 106 is also reported to the control section 101 and is stored into a memory (storage section) which is not depicted.

(Process 2) Analysis of a Wind Speed
Next, analysis of a wind speed using a measurement acoustic wave signal having the frequency bandwidth determined on the result of the noise analysis executed in (Process 1) described above.

The acoustic wave generating section 107 generates an acoustic wave having the characteristic reported by the signal selecting section 106. That is, the acoustic wave generating section 107 generates a measurement acoustic wave signal that mainly including a low-intensity (level) frequency component (fx) among the signal components (frequency components) of the noise and outputs the measurement acoustic wave signal to the acoustic wave transmitting section 108.

The acoustic wave transmitting section 108 performs D/A conversion of the measurement acoustic wave generated by the acoustic wave generating section 107 and outputs the converted wave to the outside of the wind speed measuring device 100 through a loudspeaker or the like.

It is to be noted that an output timing of the measurement acoustic wave is controlled by the control section 101. The control section 101 stores, into a memory (storage section) which is not depicted, output signal waveform information (signal waveform on a time axis) including information regarding a measurement acoustic wave output time.

The acoustic wave receiving section 102 receives an acoustic wave including noise superimposed on the measurement acoustic wave transmitted from the acoustic wave transmitting section 108, performs A/D conversion of the received acoustic wave, and outputs the resultant acoustic wave to the propagation time measuring section 104 and the signal analyzing section 103. It is to be noted that the data outputted from the acoustic wave receiving section 102 to the propagation time measuring section 104 and the signal analyzing section 103 includes signal waveform data on a time axis, and the reception timing (time information) of the data is analyzable.

The propagation time measuring section 104 receives, from the control section 101, the signal waveform on the time axis at the transmission time of the measurement acoustic wave, measures, on the basis of the signal waveform inputted from the acoustic wave receiving section 102, the propagation time of the measurement acoustic wave, that is, an elapsed time from the transmission timing of the measurement acoustic wave at the acoustic wave transmitting section 108 to the reception timing at the acoustic wave receiving section 102, and reports the propagation time to the wind speed calculating section 105.

The signal analyzing section 103 receives the measurement acoustic wave characteristic from the control section 101, performs signal processing such as FFT on a signal transmitted from the acoustic wave receiving section 102, measures the frequency variation with respect to the measurement acoustic wave, and reports the frequency variation to the wind speed calculating section 105.

It is to be noted that the propagation time measuring section 104 and the signal analyzing section 103 analyze the propagation time and the frequency variation of only an acoustic wave having a frequency component around a frequency region corresponding to the measurement acoustic wave. As a result of this process, the analysis can be carried out while the effect of noise is reduced.

The wind speed calculating section 105 calculates a wind speed by using the propagation time reported by the propagation time measuring section 104 and the frequency variation reported by the signal analyzing section 103.

As previously explained, the propagation time and the frequency vary depending on the flow of air between the acoustic wave transmitting section 108 and the acoustic wave receiving section 102, that is, depending on a wind speed. The wind speed calculating section 105 calculates a wind speed on the basis of such variations. It is to be noted that a wind speed in the direction of a straight line connecting the acoustic wave transmitting section 108 to the acoustic wave receiving section 102 is calculated.

The wind speed calculating section 105 holds, for example, a table in which data on the correspondence between a propagation time and a wind speed is recorded, and a table in which data on the correspondence between a frequency variation and a wind speed is recorded, and calculates a wind speed by referring to the table. Alternatively, a wind speed is calculated through calculation using a function for calculating a wind speed from a propagation time, or a function for calculating a wind speed from a frequency variation.

It is to be noted that, in the present embodiment, both data on the propagation time reported by the propagation time measuring section 104 and data on the frequency variation reported by the signal analyzing section 103 are used to calculate a wind speed, but only either the propagation time or the frequency variation may be used to calculate a wind speed. In a case where both data on the propagation time and data on the frequency variation are used to calculate a wind speed, computation of calculating the average of values calculated on the basis of the respective data, or calculating a weighted average by using a weight coefficient corresponding to a predetermined reliability degree, for example, can be conducted.

The wind speed measuring device 100 depicted in FIG. 1 calculates a wind speed by measuring at least either the propagation time or the frequency variation. It is to be noted that a wind speed in the direction of a straight line connecting the acoustic wave transmitting section 108 to the acoustic wave receiving section 102 is calculated.

The control section 101 performs overall control of processes which are executed by the sections of the wind speed measuring device 100. For example, the control section 101 performs control according to a program stored in a memory (storage section) which is not depicted. Specifically, for example, in order to carry out signal analysis of noise only and signal analysis for measuring a wind speed in time division, control to output process commands to the acoustic wave generating section 107, the propagation time measuring section 104, and the signal analyzing section 103 is performed.

That is, in order to perform the aforementioned. (Process 1) and (Process 2) in time division, the control section 101 controls the acoustic wave generating section 107, the propagation time measuring section 104, and the signal analyzing section 103.

Specifically, the following two processes are performed.
(Process 1) Noise signal analysis
(Process 2) Wind-speed analysis of determining a measurement acoustic wave characteristic on the basis of the result of the noise analysis, and transmitting/receiving a measurement acoustic wave having the determined characteristic As explained previously, in the wind speed measuring device 100 depicted in FIG. 1, a signal having a low-level frequency component among the components of the noise is set as a measurement acoustic wave to be outputted from the acoustic wave transmitting section 108. Further, in analysis of a signal received by the acoustic wave receiving section 102, the propagation time and the frequency variation of only a frequency component around a frequency region corresponding to the measurement acoustic wave are analyzed. As a result of these processes, the analysis can be carried out while the effect of the noise is reduced.

As a result of this, highly precise wind speed measurement using a measurement acoustic wave having a frequency characteristic with few noise components can be performed.

Next, a sequence of a wind speed measuring process of the present first embodiment will be explained with reference to a flowchart depicted in FIG. 3. It is to be noted that processes following this flow can be executed according to a program stored in a storage section, not depicted in FIG. 1, of the wind speed measuring device 100 depicted in FIG. 1, and under control of a control section (data processing section) equipped with a CPU or the like having a program executing function. Steps of the flow depicted in FIG. 3 will be explained in order.

(Step S101)

First, at step S101, while an output of a measurement acoustic wave from the acoustic wave transmitting section 108 is halted, A/D conversion of an acoustic wave, that is, noise received by the acoustic wave receiving section 102 is performed.

This step is executed by the acoustic wave receiving section 102.

(Step S102)

Next, at step S102, frequency spectrum analysis of the noise received and A/D converted at step S101 is carried out.

This step is executed by the signal analyzing section 103.

The signal analyzing section 103 analyzes the frequency spectrum and the signal level of the noise by performing signal processing such as FFT (fast Fourier transform).

(Step S103)

Next, at step S103, it is determined that a measurement acoustic wave characteristic is having, as a main bandwidth, a frequency bandwidth with a relatively low intensity among the frequency components constituting the noise, and a measurement acoustic wave having the determined characteristic is generated.

This step is executed by the signal selecting section 106 and the acoustic wave generating section 107.

The signal selecting section 106 determines the measurement acoustic wave characteristic on the basis of the result of the noise analysis at step S102. That is, the signal selecting section 106 determines, as the measurement acoustic wave characteristic, a low-intensity (level) signal component (frequency component) among the signal components (frequency components) of the noise, and causes the acoustic wave generating section 107 generate a measurement acoustic wave signal having the determined frequency component.

(Step S104)

Next, at step S104, the measurement acoustic wave generated by the acoustic wave generating section 107 is outputted through the acoustic wave transmitting section 108.

(Step S105)

Next, at step S105, A/D conversion of the acoustic wave signal received by the acoustic wave receiving section 102 is performed.

This step is executed by the acoustic wave receiving section 102.

It is to be noted that, in the acoustic wave signal received by the acoustic wave receiving section 102, the measurement acoustic wave outputted from the acoustic wave transmitting section 108 and noise are mixed.

(Step S106)

Next, at step S106, analysis of the frequency spectrum of the acoustic wave signal received by the acoustic wave receiving section 102 is carried out.

This step is executed by the signal analyzing section 103.

The signal analyzing section 103 analyzes the frequency spectrum and the signal level of the received acoustic wave (measurement acoustic wave signal+noise) by performing signal processing such as FFT (fast Fourier transform).

(Step S107)

Next, at step S107, the propagation time and the frequency variation of the acoustic wave is analyzed.

This step is executed by the propagation time measuring section 104 and the signal analyzing section 103.

The propagation time measuring section 104 and the signal analyzing section 103 analyze the propagation time and the frequency variation of only an acoustic wave having a frequency component around a frequency region (the frequency fx in FIG. 2) corresponding to the measurement acoustic wave.

That is, the propagation time and the frequency variation of only an acoustic wave signal having a frequency component close to the frequency component of the measurement acoustic wave outputted from the acoustic wave transmitting section 108 at step S104 are analyzed. As a result of this step, analysis can be carried out while the effect of the noise is reduced.

(Step S108)

Finally, at step S108, the wind speed is calculated on the basis of the analysis result of the propagation time and the frequency variation analyzed at step S107.

This step is executed by the wind speed calculating section 105.

The wind speed calculating section 105 calculates a wind speed by using the propagation time reported by the propagation time measuring section 104 and the frequency variation reported by the signal analyzing section 103.

As previously explained, the wind speed calculating section 105 holds, for example, a table in which data on the correspondence between a propagation time and a wind speed is recorded, and a table in which data on the correspondence between a frequency variation and a wind speed is recorded, and calculates a wind speed by referring to the table. Alternatively, a wind speed is calculated by calculation using a function for calculating a wind speed from a propagation time, or a function for calculating a wind speed from a frequency variation. It is to be noted that a wind speed in the direction of a straight line connecting the acoustic wave transmitting section 108 to the acoustic wave receiving section 102 is calculated.

It is to be noted that, in the explained flow, both data on the propagation time reported by the propagation time measuring section 104 and data on the frequency variation reported by the signal analyzing section 103 are used to calculate a wind speed, but only either the propagation time or the frequency variation may be used to calculate a wind speed, as previously explained. In a case where both data on the propagation time and data on the frequency variation are used to calculate a wind speed, computation of calculating the average of values calculated on the basis of the data, or calculating a weighted average by using a weight coefficient according to a predetermined reliability degree, for example, can be carried out.

Figure 3:
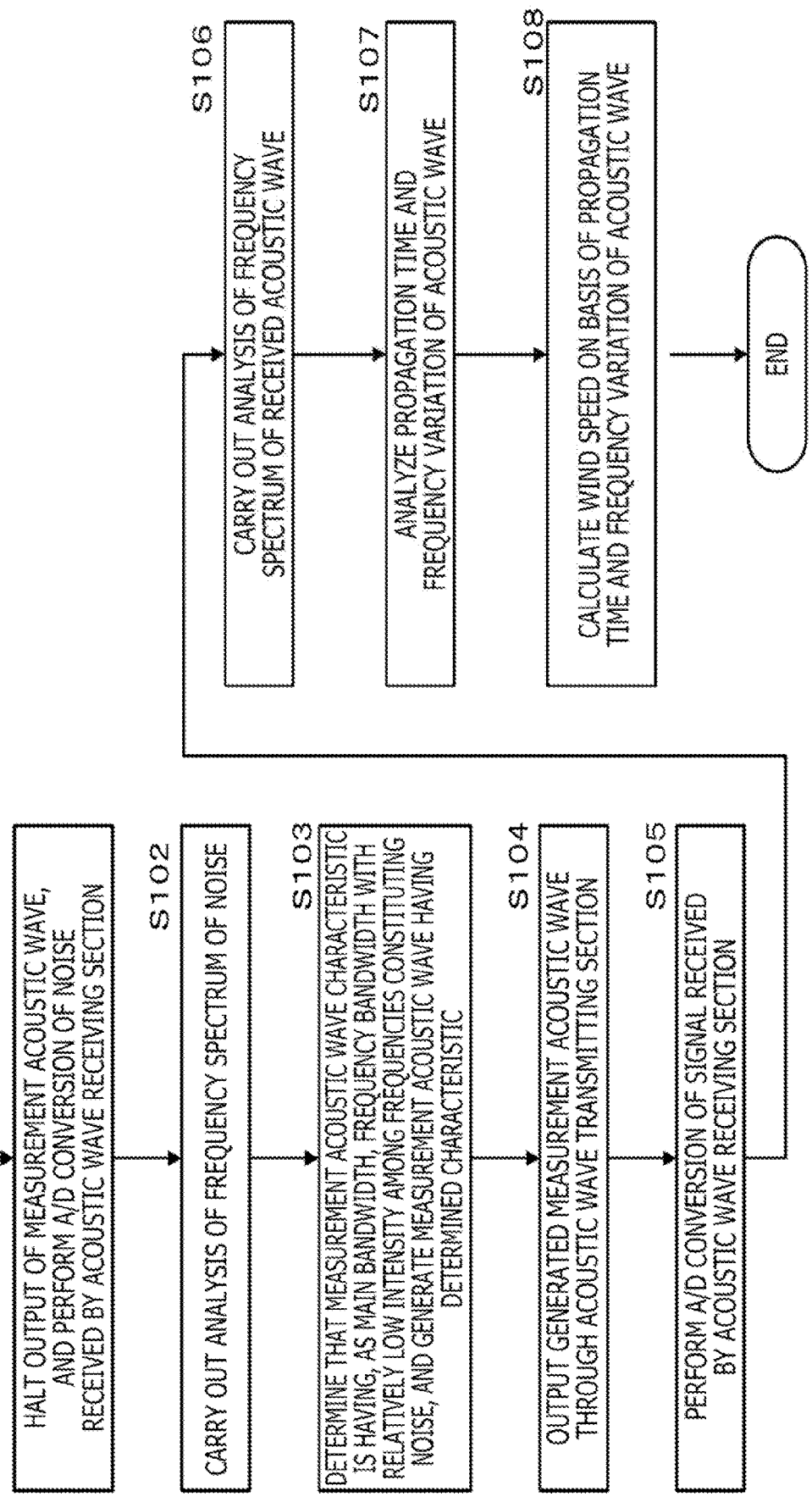
FIG. 3 is a diagram depicting a flowchart for explaining a process sequence of processes which are executed by the wind speed measuring device according to the present disclosure.

The processes following the flowchart in FIG. 3 are performed so that highly precise wind-speed measurement using a measurement acoustic wave having a frequency characteristic with few noise components can be performed.

[2. Configuration and Processes in Second Embodiment of Wind Speed Measuring Device According to Present Disclosure]

Next, a configuration and processes in a second embodiment of the wind speed measuring device according to the present disclosure will be explained.

While the aforementioned wind speed measuring device according to the first embodiment measures only a wind speed, the wind speed measuring device according to the second embodiment measures a wind direction as well as a wind speed.

Specifically, a wind direction and a wind speed are measured by a configuration including plural sets each including an acoustic wave transmitting section and acoustic wave receiving sections in different directions.

A specific example will be explained with reference to FIG. 4.

Figure 4:
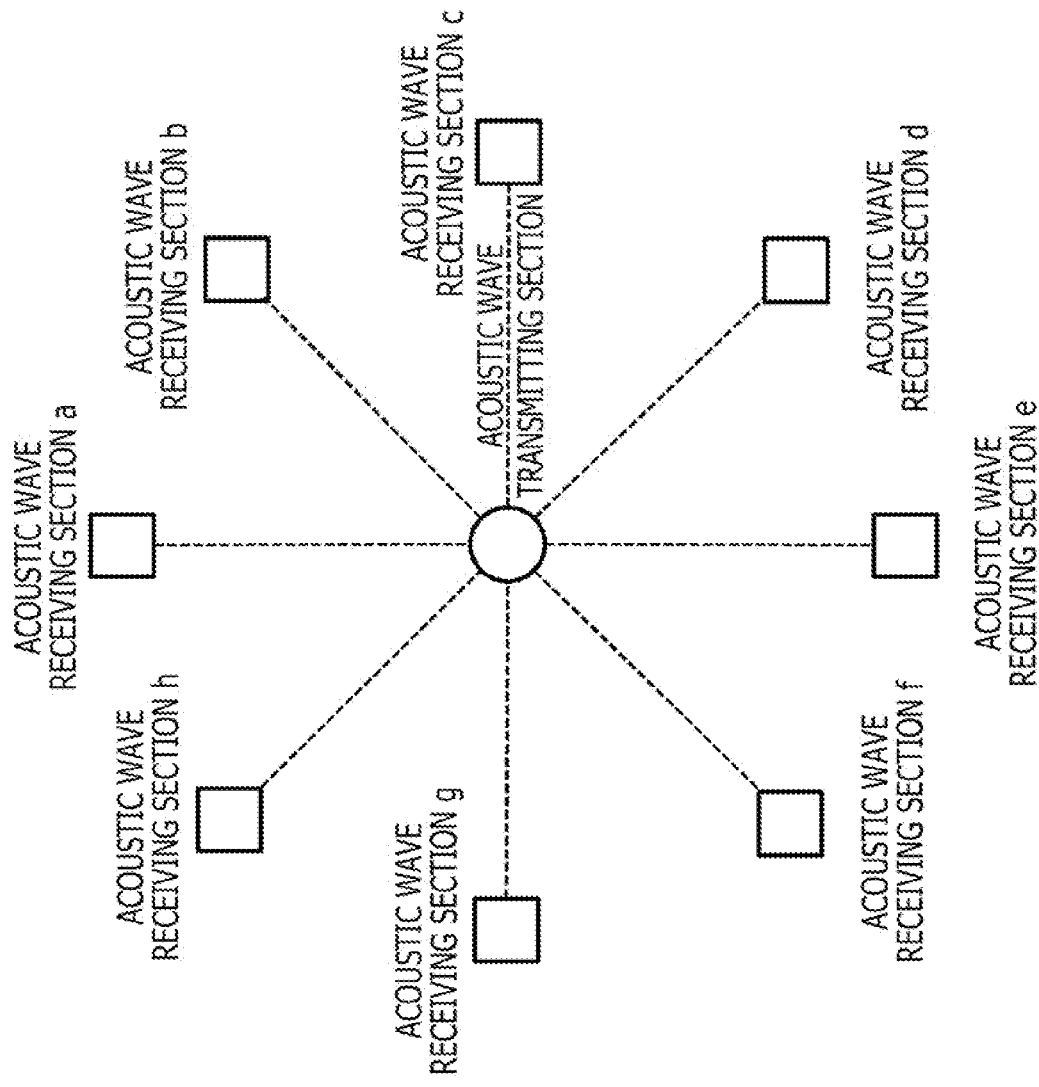
FIG. 4 is an explanatory diagram of an arrangement example of acoustic wave receiving sections in a wind direction-and-wind speed measuring device according to the present disclosure.

FIG. 4 depicts an arrangement example in a case where a wind direction and a wind speed are measured with one acoustic wave transmitting section shared by plural acoustic wave receiving sections a to h.

In the example depicted in FIG. 4, the plural acoustic wave receiving sections a to h are disposed at an equal distance from the acoustic wave transmitting section which is located at the center, and the adjacent acoustic wave receiving sections are equally spaced.

Acoustic waves received by the respective plural acoustic wave receiving sections a to h are analyzed so that a wind direction as well as a wind speed can be analyzed.

Figure 5:
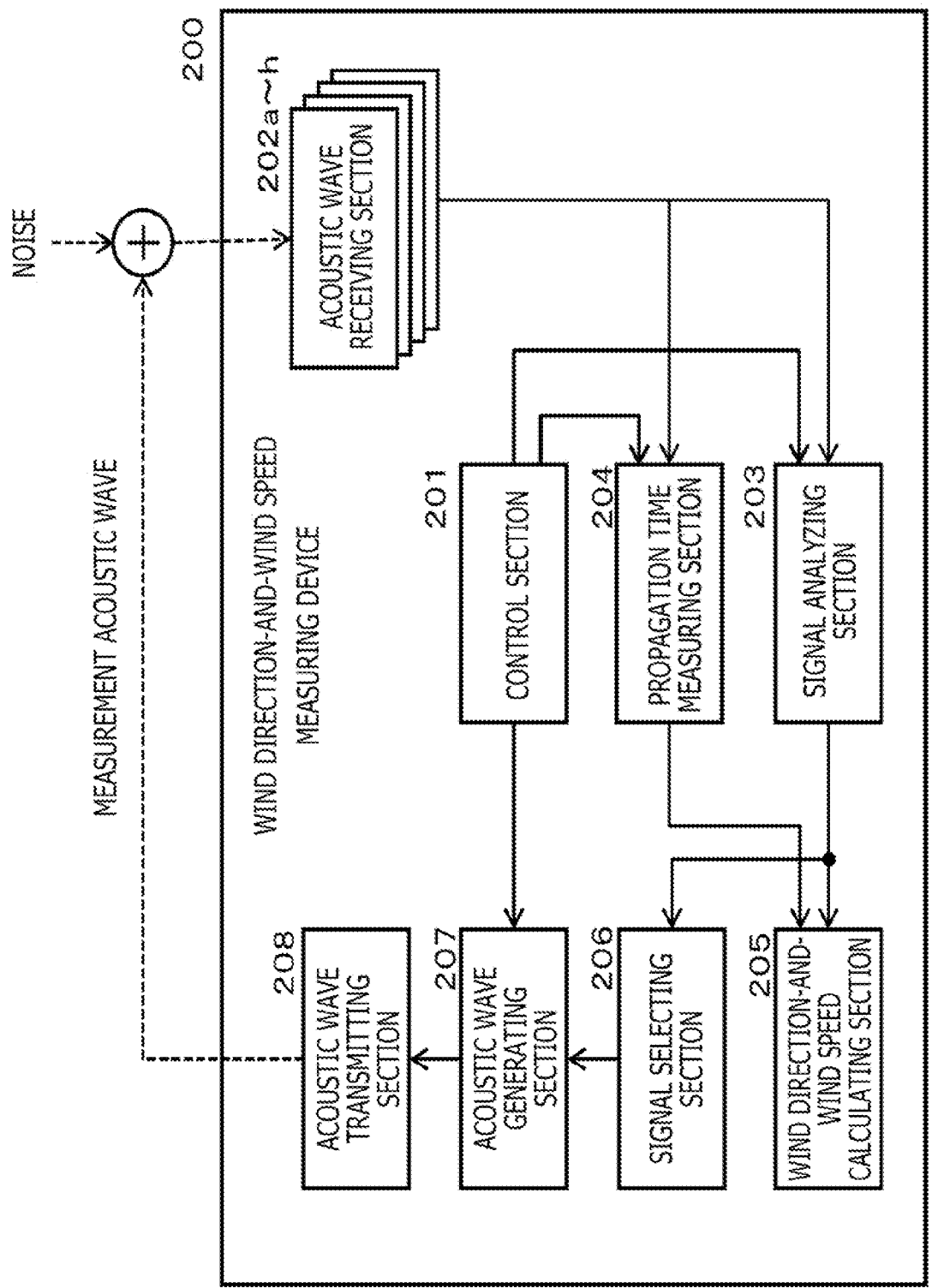
FIG. 5 is an explanatory diagram of a configuration example of the wind direction-and-wind speed measuring device according to the present disclosure.

FIG. 5 is a block diagram depicting a configuration of a wind direction-and-wind speed measuring device 200 according to the second embodiment of the present disclosure having the configuration depicted in FIG. 4.

As depicted in FIG. 5, the wind direction-and-wind speed measuring device 200 includes a control section 201, acoustic wave receiving sections 202a to h, a signal analyzing section 203, a propagation time measuring section 204, a wind direction-and-wind speed calculating section 205, a signal selecting section 206, an acoustic wave generating section 207, and an acoustic wave transmitting section 208.

The wind direction-and-wind speed measuring device 200 differs from the wind speed measuring device 100 which has been explained above with reference to FIG. 1 in that the plural acoustic wave receiving sections 202a to h are provided instead of one acoustic wave receiving section 102 of the first embodiment, and that the wind direction-and-wind speed calculating section 205 is provided instead of the wind speed calculating section 105 of the first embodiment.

The arrangement configuration of the plural acoustic wave receiving sections 202a to h is the configuration explained above with reference to FIG. 4, for example. Specifically, the plural acoustic wave receiving sections 202a to h are disposed at different relative positions with respect to the one acoustic wave transmitting section 208. That is, the plural acoustic wave receiving sections 202a to h are disposed at an equal distance from the one acoustic wave transmitting section 208 which is located at the center, and the adjacent acoustic wave receiving sections are equally spaced.

It is to be noted that the configuration using eight acoustic wave receiving sections has been explained in the example explained above with reference to FIG. 4, but the number of the acoustic wave receiving sections is not limited to eight, and can be set to any number that is two or greater. However, in a case where analysis of a wind direction is carried out, arrangement of two or more acoustic wave receiving sections needs to be designed such that the one acoustic wave transmitting section and the plural acoustic wave receiving sections are not aligned on a single straight line. Configuration examples using two or more acoustic wave receiving sections will be explained later.

Also in the second embodiment, the following two processes are executed, as in the first embodiment which has been explained above.

(Process 1) Noise signal analysis
(Process 2) Analysis of a wind speed

In the (Process 1) Noise signal analysis, acoustic signals received by one or plural acoustic wave receiving sections are analyzed, and a measurement acoustic wave characteristic is selected.

That is, as in the first embodiment, a low-intensity (level) frequency component (fx), among the signal component (frequency components) of noise, is determined as a measurement acoustic wave characteristic, the acoustic wave generating section 207 is caused to generate a measurement acoustic wave signal mainly including the frequency component, and the measurement acoustic wave signal is outputted through the acoustic wave transmitting section 208.

Further, in the (Process 2) Analysis of a wind speed, analysis of a wind speed is carried out through transmission/reception of the measurement acoustic wave having the characteristic determined in the above (Process 1). In the second embodiment, the propagation time and the frequency variation of each of acoustic wave signals received by the respective plural acoustic wave receiving sections 202a to h disposed at plural positions are measured by the propagation time measurement 204 and the signal analyzing section 203.

Furthermore, the wind direction-and-wind speed calculating section 205 calculates wind speed components in the respective directions from the acoustic wave transmitting section 208 to the acoustic wave receiving sections 202a to h by using the plural measurement results, and calculates the final wind direction and the final wind speed on the basis of the wind speed components in these plural different directions.

In the present second embodiment, plural acoustic wave receiving sections disposed at different relative positions with respect to the acoustic wave transmitting section 208 is used to enable measurement of a wind direction as well as a wind speed.

By disposing the plural acoustic wave receiving sections at different relative positions with respect to the acoustic wave transmitting section 208 is provided, not only measurement of a wind direction is enabled but also the accuracy of the measured data can be improved.

Specific examples will be explained with reference to FIGS. 6 and 7.

Figure 6:
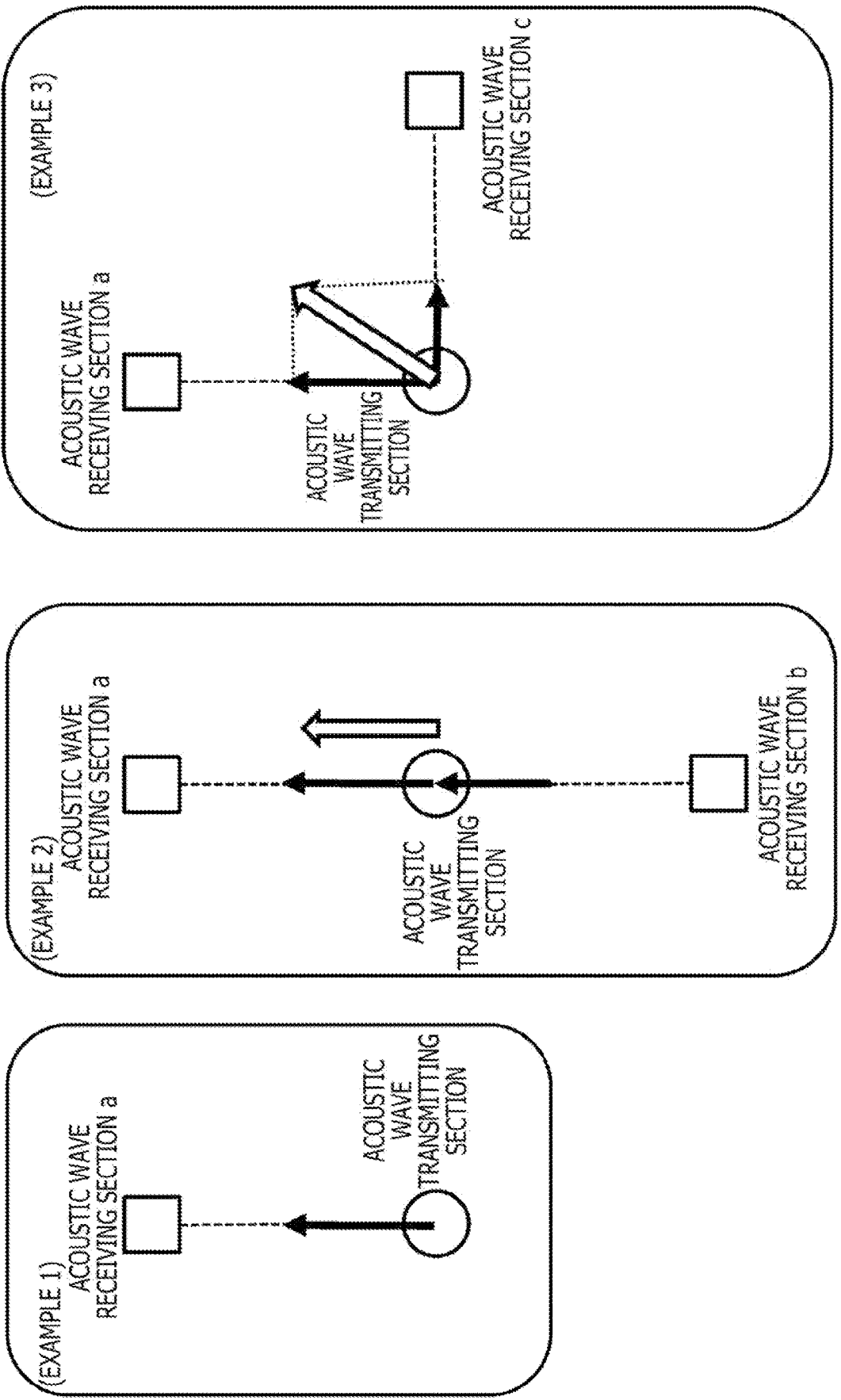
FIG. 6 is a diagram for explaining arrangement examples of the acoustic wave receiving sections in the wind direction-and-wind speed measuring device according to the present disclosure.

FIGS. 6 and 7 depict the following five arrangement examples of the acoustic wave receiving sections.

(Example 1) Example in which one acoustic wave receiving section a is disposed (Example 2) Example in which two acoustic wave receiving sections a and b are disposed at opposed positions on a straight line with an acoustic wave transmitting section located at the intermediate position therebetween (Example 3) Example in which two acoustic wave receiving sections a and c are disposed on respective axes that are orthogonal to each other with an acoustic wave transmitting section set as an origin (Example 4) Example in which two acoustic wave receiving sections a and c are disposed on respective axes that are orthogonal to each other with an acoustic wave transmitting section set as an origin, and a third acoustic wave receiving section d is disposed at the intermediate position between the orthogonal axes (Example 5) Example in which two acoustic wave receiving sections a and b are disposed at opposed positions on a straight line with an acoustic wave transmitting section located at the intermediate position therebetween, one acoustic wave receiving section c is disposed on an axis orthogonal to the straight line, and further, acoustic wave receiving sections d and e are disposed at the intermediate positions between the straight line and the respective orthogonal axes.

Black vectors indicated by black arrows depicted in (Example 1) to (Example 5) each have a length corresponding to a wind speed which is analyzed on the basis of an acoustic wave signal measured by the corresponding acoustic wave receiving section.

In addition, white vectors indicated by white arrows depicted in (Example 2) to (Example 5) include wind direction information (=direction of the vector) and wind speed information (length of the vector) calculated on the basis of a plurality of the black vectors.

(Example 1) Example in which one acoustic wave receiving section a is disposed

This acoustic wave receiving section arrangement example corresponds to the configuration of the first embodiment which has been explained above. In this example, only a wind speed on a straight line connecting one acoustic wave transmitting section to one acoustic wave receiving section can be detected.

In addition, in the example, which is depicted in (Example 2), two acoustic wave receiving sections a and b are disposed at opposed positions on a straight line with an acoustic wave transmitting section located at the intermediate position therebetween, the average value of wind speeds analyzed at each of the two acoustic wave receiving sections a and b is calculated to calculate a white vector which is depicted in the drawing. The length of the white vector corresponds to the average wind speed of the wind speeds analyzed at each of the two acoustic wave receiving sections a and b. Detection of a wind speed can be carried out with higher precision than that in a case where an analysis result obtained by one acoustic wave receiving section is used.

In each of acoustic wave receiving section arrangements depicted in (Example 3) to (Example 5), one acoustic wave transmitting section and plural acoustic wave receiving sections are designed so as not to be aligned on a single straight line. With such a configuration, a wind direction as well as a wind speed can be analyzed.

(Example 3) Example in which two acoustic wave receiving sections a and c are disposed on respective axes that are orthogonal to each other with the acoustic wave transmitting section set as an origin In this example, the acoustic wave receiving sections a and c can detect wind speeds in different directions. Two black vectors depicted in (Example 3) of FIG. 6 have lengths corresponding to the wind speeds in the corresponding directions analyzed on the basis of signals detected by the respective acoustic wave receiving sections a and c.

One white vector depicted in the drawing is generated by combining the two vectors.

In the white vector, the actual wind direction (=direction of the vector) and the actual wind speed (=length of the vector) are correctly reflected.

Since the one acoustic wave transmitting section and the plural acoustic wave receiving sections are designed so as not to be aligned on a single straight line, as described above, a wind speed and a wind direction can be analyzed.

(Example 4) which is depicted in FIG. 7 and in which two acoustic wave receiving sections a and c are disposed on respective orthogonal axes with an acoustic wave transmitting section set as an origin, and a third acoustic wave receiving section d is disposed at the intermediate position (at an angle of 45 degrees toward an obliquely upward direction from the acoustic wave transmitting section) between the orthogonal axes This example is obtained by adding, to the two acoustic wave receiving sections a and c depicted in (Example 3), another acoustic wave receiving section d at a position at which the angle with respect to the acoustic wave transmitting section is substantially equal to a half of the angle between the acoustic wave receiving sections a and c.

The three acoustic wave receiving sections a, c, and d detect wind speeds in different directions. Three black vectors depicted in (Example 4) of FIG. 7 have lengths corresponding to wind speeds in respective directions analyzed on the basis of signals detected by the respective acoustic wave receiving sections a, c, and d.

One white vector depicted in FIG. 7 is generated by combining the three vectors.

In the white vector, the actual wind direction (=direction of the vector) and the actual wind speed (=length of the vector) are correctly reflected.

(Example 5) Example in which two acoustic wave receiving sections a and b are disposed at opposed positions on a straight line with an acoustic wave transmitting section located at the intermediate position therebetween, one acoustic wave receiving section c is disposed on an axis orthogonal to the straight line, and further, acoustic wave receiving sections d and e are disposed at the intermediate positions between the straight line and the respective orthogonal axes.

This example has a configuration using five acoustic wave receiving sections a to e.

The five acoustic wave receiving sections a to e detect wind speeds in different directions. Five black vectors depicted in (Example 5) of FIG. 7 have lengths corresponding to the wind speeds in the respective directions analyzed on the basis of signals detected by the respective acoustic wave receiving sections a to e.

One white vector depicted in FIG. 7 is generated by combining the five vectors.

In the white vector, the actual wind direction (=direction of the vector) and the actual wind speed (=length of the vector) are correctly reflected.

Since analysis results of more acoustic wave receiving sections are used in the manner explained above, analysis of a wind speed and a wind direction can be carried out with higher precision.

The eight acoustic wave receiving sections a to h are disposed in eight directions about the acoustic wave transmitting section located at the center, as in the configuration previously explained with reference to FIG. 4, signals received by the respective acoustic wave receiving sections a to h are analyzed, and the analysis results are combined, whereby an analysis result of a wind speed and a wind direction can be obtained with higher precision.

Next, a sequence of measuring a wind speed and a wind direction of the present second embodiment will be explained with reference to a flowchart depicted in FIG. 8. It is to be noted that processes following this flow can be executed according to a program stored in a storage section, not depicted in FIG. 5, of the wind direction-and-wind speed measuring device 200 and under control of a control section (data processing section) equipped with a CPU or the like having a program execution function. Steps of the flow depicted in FIG. 8 will be explained in order.

(Step S201)

First, at step S201, in a state where an output of a measurement acoustic wave from the acoustic wave transmitting section 208 is halted, A/D conversion is performed on acoustic waves, that is, noise received by one or plural acoustic wave receiving sections 202.

This step is executed by the acoustic wave receiving section 202.

(Step S202)

Next, at step S202, the frequency spectrum of the noise received and A/D-converted at step S201 is analyzed.

This step is executed by the signal analyzing section 203.

The signal analyzing section 203 performs signal processing such as FFT (fast Fourier transform) to analyze the frequency spectrum and the signal level of the noise.

(Step S203)

Next, at step S203, it is determined that a measurement acoustic wave characteristic is having, as a main bandwidth, a frequency bandwidth with a relatively low intensity among the frequency components constituting the noise, and a measurement acoustic wave having the determined characteristic is generated.

This step is executed by the signal selecting section 206 and the acoustic wave generating section 207.

The signal selecting section 206 determines the measurement acoustic wave characteristic on the basis of the result of the noise analysis at step S202. That is, the signal selecting section 206 determines, as the measurement acoustic wave characteristic, a low-intensity (level) signal component (frequency component) among the signal components (frequency components) of the noise, and causes the acoustic wave generating section 207 to generate a measurement acoustic wave signal having the determined frequency component.

(Step S204)

Next, at step S204, the measurement acoustic wave generated by the acoustic wave generating section 207 is outputted through the acoustic wave transmitting section 208.

(Step S205)

Next, at step S205, A/D conversion is performed on acoustic wave signals received by the plural acoustic wave receiving sections 202.

This step is executed by the plural acoustic wave receiving sections 202.

It is to be noted that, in the acoustic wave signals received by the plural acoustic wave receiving sections 202, the measurement acoustic wave outputted from the acoustic wave transmitting section 208 and noise are mixed.

(Step S206)

Next, at step S206, the frequency spectrum of each of the acoustic wave signals received by the plural acoustic wave receiving sections 202 is analyzed.

This step is executed by the signal analyzing section 203.

The signal analyzing section 203 performs signal processing such as FFT (fast Fourier transform) to analyze the frequency spectrum and the signal level of each of the received acoustic waves (measurement acoustic wave signals+noise).

(Step S207)

Next, at step S207, the propagation time and the frequency variation of each of the acoustic waves received by the plural acoustic wave receiving sections 202 are analyzed.

This step is executed by the propagation time measuring section 204 and the signal analyzing section 203.

The propagation time measuring section 204 and the signal analyzing section 203 analyze the propagation time and the frequency variation of only an acoustic wave having a frequency component around a frequency region (frequency fx in FIG. 2) corresponding to the measurement acoustic wave.

That is, the propagation time and the frequency variation of only an acoustic wave signal that has a frequency component close to the frequency component of the measurement acoustic wave outputted through the acoustic wave transmitting section 208 at step S204 are analyzed. As a result of this process, the analysis can be carried out while the effect of the noise is reduced.

(Step S208)

Next, at step S208, a wind speed on a straight line connecting the acoustic wave transmitting section to each of the acoustic wave receiving sections is calculated on the basis of the analysis result analyzed at step S207 on the propagation times and the frequency variations of the acoustic waves received by the plural acoustic wave receiving sections 202.

This step is executed by the wind direction-and-wind speed calculating section 205.

The wind direction-and-wind speed calculating section 205 calculates a wind speed on a straight line connecting the acoustic wave transmitting section to each of the acoustic wave receiving sections by using the propagation time reported by the propagation time measuring section 204 and the frequency variation reported by the signal analyzing section 203.

This step corresponds to the process of calculating the black vectors, which has been explained with reference to FIGS. 6 and 7.

That is, this step corresponds to a process of calculating black vectors having, in different directions, respective lengths corresponding to the wind speeds on straight lines connecting the acoustic wave transmitting section to the corresponding acoustic wave receiving sections.

(Step S209)

Finally, at step S209, the final and actual wind speed and wind direction are calculated.

This step is also executed by the wind direction-and-wind speed calculating section 205.

The wind direction-and-wind speed calculating section 205 generates a combined vector (the white vector depicted in FIG. 6 or 7) by combining the vectors (black vectors depicted in FIG. 6 or 7) having respective lengths corresponding to the wind speeds in plural different directions calculated at step S208, that is, the wind speeds on plural different straight lines connecting the acoustic wave transmitting section to the corresponding acoustic wave receiving sections.

The length of the combined vector represents the actual wind speed in the measured space, and the direction of the combined vector represents the actual wind direction in the measured space.

Figure 8:
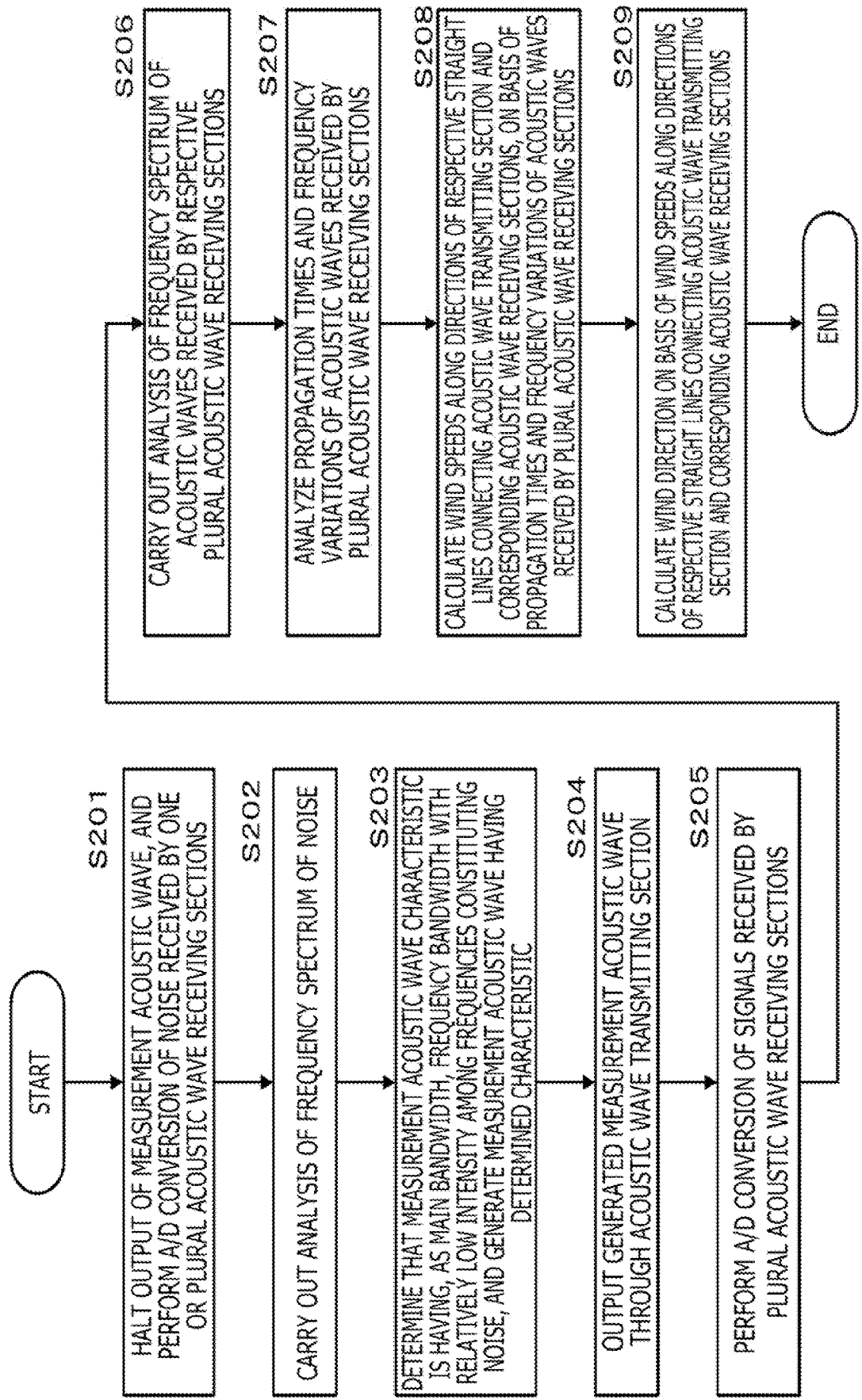
FIG. 8 is a diagram depicting a flowchart for explaining a process sequence of processes which are executed by the wind direction-and-wind speed measuring device according to the present disclosure.

Since the processes following the flowchart depicted in FIG. 8 are executed, a measurement acoustic wave having a frequency characteristic of including few noise components can be used to obtain a wind speed and a wind direction with high precision.

[3. Process of Selecting Measurement Acoustic Wave]

As previously explained, the wind speed measuring device according to the present disclosure sets, as a measurement acoustic wave, an acoustic wave signal having a particular frequency bandwidth the intensity of which is low in the frequency bandwidth constituting noise.

That is, the signal selecting section 106 depicted in FIG. 1 and the signal selecting section 206 depicted in FIG. 5 each determine, as a measurement acoustic wave characteristic, a low-intensity (level) signal component (frequency component) among the signal components (frequency components) of the noise, cause the acoustic wave generating section 107 or 207 to generate a measurement acoustic wave signal having the determined frequency component, and outputs the measurement acoustic wave signal through the acoustic wave transmitting section 108 or 208.

An example of selecting a measurement acoustic wave by means of a signal selecting section will be explained with reference to FIG. 9.

Similarly to FIG. 2 which has been explained above, FIG. 9 depicts a noise analysis result (noise spectrum) obtained by the signal analyzing section 103 of the wind speed measuring device 100 depicted in FIG. 1, for example. The horizontal axis indicates a frequency. The vertical axis indicates a signal intensity. The frequency components of noise include various frequency components ranging from a low frequency to a high frequency. However, the level of the signal intensity varies without being uniform over the frequencies.

One example of a process of selecting a measurement acoustic wave by means of a signal selecting section will be explained.

Figure 9:
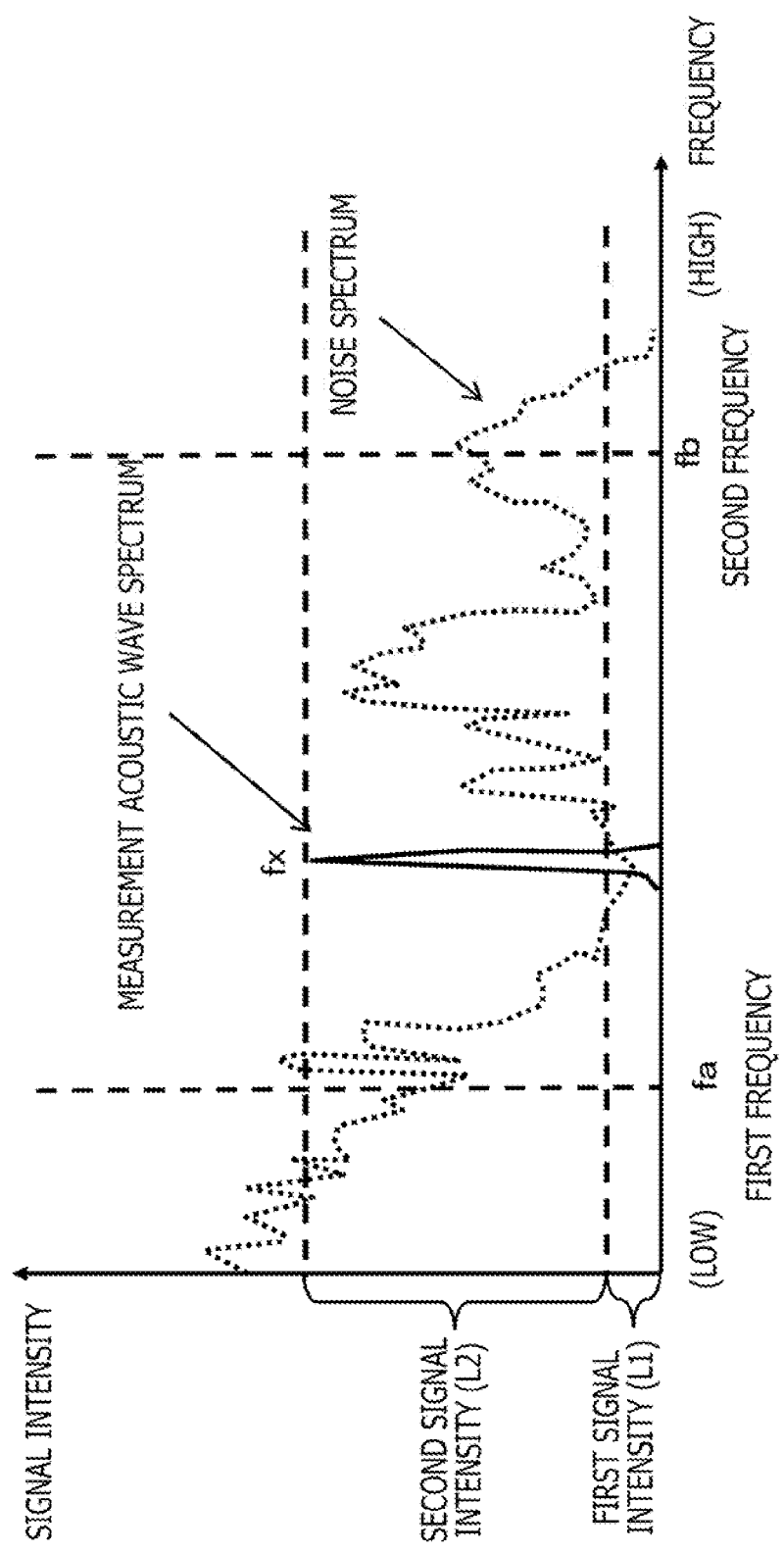
FIG. 9 is an explanatory diagram of an example of a process of selecting a measurement acoustic wave outputted by a wind speed measuring device according to the present disclosure.

First, search is conducted in a region from a predetermined first frequency (fa) to a predetermined second frequency (fb) in the noise spectrum depicted in FIG. 9, and a frequency at which the signal intensity becomes minimum is detected. In the example depicted in FIG. 9, the frequency (fx) is detected.

The frequency (fx) is selected as a frequency for a measurement acoustic wave.

It is to be noted that, in a case where plural frequencies at which the signal intensity becomes minimum are detected within the search range from the predetermined first frequency (fa) to the predetermined second frequency (fb), a priority selection order is previously determined such that, for example, a high frequency side one is selected.

Another example of determining a frequency for a measurement acoustic wave will be explained.

In this example, first, a predetermined first signal intensity (L1) is previously determined as a signal intensity of a noise level allowable in a frequency bandwidth that matches a frequency bandwidth selected for a measurement acoustic wave.

Next, as in the aforementioned example, a predetermined frequency search width from the second frequency (fb) to the first frequency (fa) is searched, and a frequency that is first detected to be lower than the predetermined first signal intensity (L1) is selected. In this case, full search in the range from the first frequency to the second frequency does not need to be conducted so that the speed of the signal selection processing can be increased.

The signal intensity of a measurement acoustic wave may be set to an outputtable maximum value. However, when the signal intensity is set to a value obtained by adding the predetermined second signal intensity (L2) to the noise signal intensity of the selected frequency (fx), power consumption of the acoustic wave transmitting section can be suppressed.

In the manner described so far, for example, the signal selecting section 106 depicted in FIG. 1 and the signal selecting section 206 depicted in FIG. 5 each select a measurement acoustic wave such that the effect of noise can be avoided.

[4. Configuration and Processes of Wind Direction-and-Wind Speed Measuring Device that is Mounted on Mobile Body]

Next, a configuration and processes of a wind direction-and-wind speed measuring device that is mounted on a mobile body of various types including a vehicle and a drone will be explained.

Figure 10:
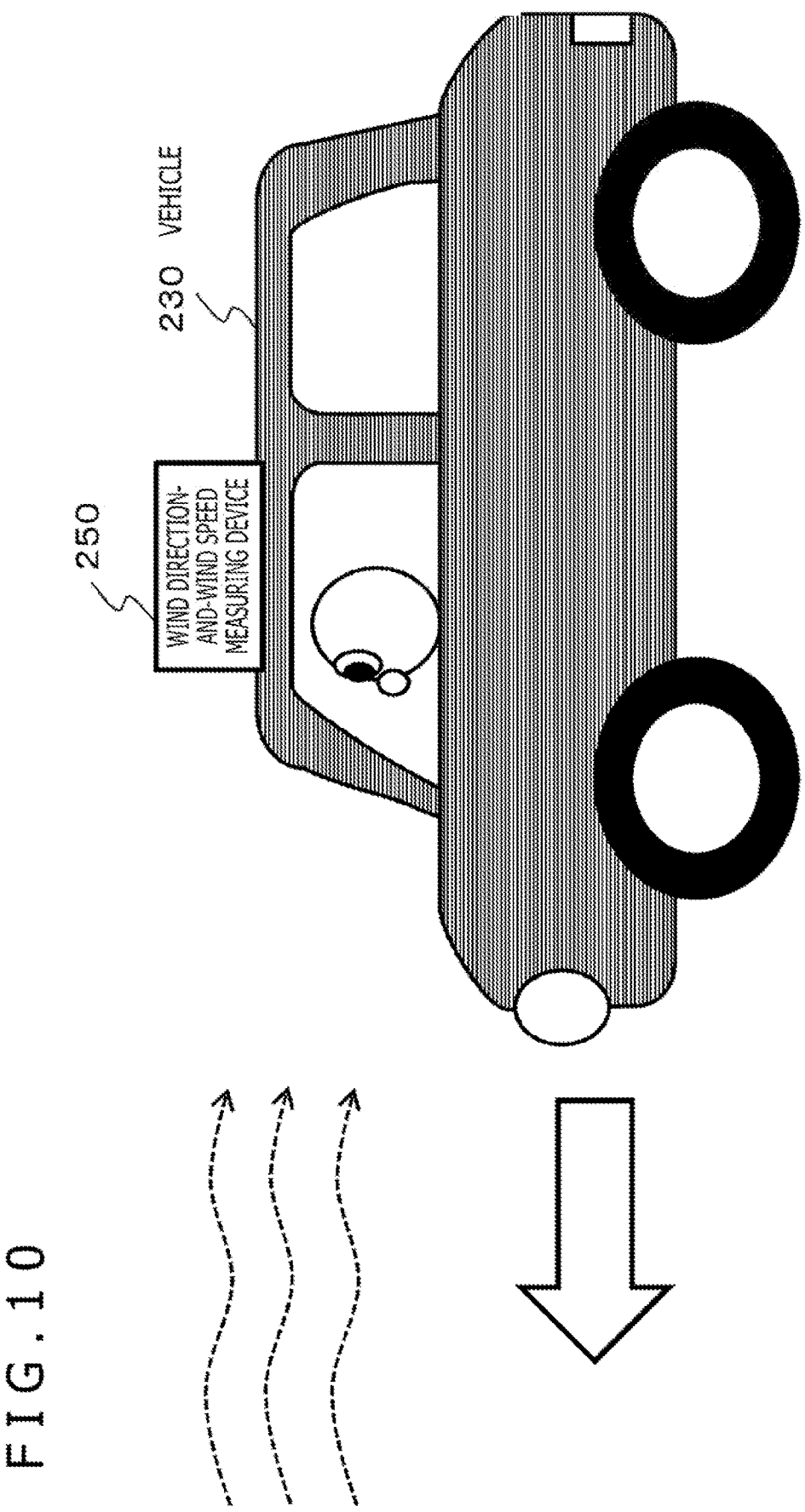
FIG. 10 is an explanatory diagram of a process in a case where a wind direction-and-wind speed measuring device is mounted on a mobile apparatus.

For example, a wind direction and a wind speed are measured with a wind direction-and-wind speed measuring device 250 mounted on a vehicle 240, as depicted in FIG. 10. In this case, the wind direction-and-wind speed measuring device 250 measures a wind direction and a wind speed that are different from those observed in a still state. That is, to the observed wind, a wind according to a movement speed and a movement direction of the vehicle 240 has been added.

Here, observation data obtained by observing a wind direction and a wind speed to which the effect of wind according to a movement speed and a movement direction of a mobile body such as the vehicle 240 has been added is defined as "data on the wind direction and the wind speed to the air."

Meanwhile, observation data obtained by observing a wind direction and a wind speed in a still state is defined as "data on the wind direction and the wind speed to the ground."

When a wind direction and a wind speed are measured with the wind direction-and-wind speed measuring device 200 of the second embodiment which has been explained with reference to FIG. 5, mounted on the vehicle 240, as depicted in FIG. 10, the values of the wind direction and the wind speed calculated by the wind direction-and-wind speed calculating section 205 of the wind direction-and-wind speed measuring device 200 depicted in FIG. 5 are the "data on the wind direction and the wind speed to the air."

That is, the "data on the wind direction and the wind speed to the ground," which corresponds to a wind direction and a wind speed observed in a still state, is not be calculated.

Hereinafter, a third embodiment having a configuration in which both "data on the wind direction and the wind speed to the air" that is about a wind direction and a wind speed to which an effect of a wind according to a movement speed and a movement direction of a mobile body have been added, and "data on the wind direction and the wind speed to the ground" that is about a wind direction and a wind speed observed in a still state can be calculated, will be explained.

Figure 11:
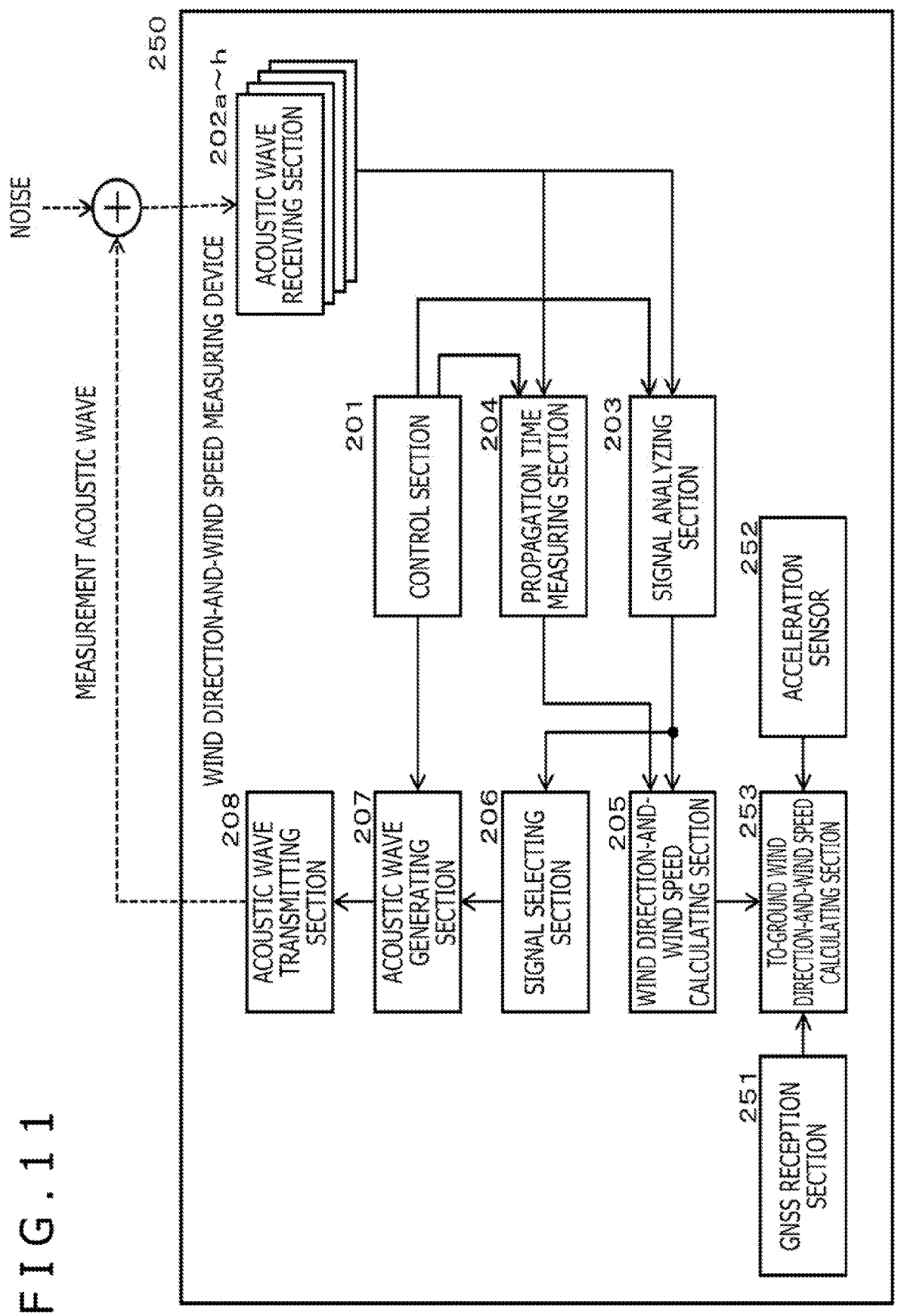
FIG. 11 is an explanatory diagram of a configuration example of the wind direction-and-wind speed measuring device according to the present disclosure.

FIG. 11 is a block diagram depicting a configuration of the wind direction-and-wind speed measuring device 250 according to the third embodiment of the present disclosure. Similarly to the wind direction-and-wind speed measuring device 200 according to the second embodiment which has been explained with reference to FIG. 5, the wind direction-and-wind speed measuring device 250 includes the control section 201, the acoustic wave receiving sections 202a to h, the signal analyzing section 203, the propagation time measuring section 204, the wind direction-and-wind speed calculating section 205, the signal selecting section 206, the acoustic wave generating section 207, and the acoustic wave transmitting section 208, as depicted in FIG. 11.

In addition to these constituents, the wind direction-and-wind speed measuring device 250 according to the third embodiment depicted in FIG. 11 further includes a GNSS reception section 251, an acceleration sensor 252, and a to-ground wind direction-and-wind speed calculating section 253.

A process using the control section 201 to the acoustic wave transmitting section 208 is similar to that of the second embodiment which has been explained with reference to FIG. 5. However, the wind direction-and-wind speed calculating section 205 calculates a wind direction and a wind speed by adding the effect of a wind according to a movement speed and a movement direction of a mobile body, that is, calculates "data on the wind direction and the wind speed to the air."

The "data on the wind direction and the wind speed to the air" calculated by the wind direction-and-wind speed calculating section 205 is outputted to the to-ground wind direction-and-wind speed calculating section 253. The to-ground wind direction-and-wind speed calculating section 253 calculates "data on the wind direction and the wind speed to the ground," that is, calculates a wind direction and a wind speed in a still state, by using the "data on the wind direction and the wind speed to the air" calculated by the wind direction-and-wind speed calculating section 205 and using information inputted from the GNSS reception section 251 and the acceleration sensor 252.

The GNSS reception section 251 is a global positioning system (Global Navigation Satellite System) and measures the current position through a positioning process using a satellite.

The GNSS reception section 251 acquires the current position of a mobile apparatus such as a vehicle equipped with the wind direction-and-wind speed measuring device 250 and outputs information regarding the acquired current position to the to-ground wind direction-and-wind speed calculating section 253.

Further, the acceleration sensor 252 detects the acceleration of the mobile apparatus such as the vehicle equipped with the wind direction-and-wind speed measuring device 250 and outputs information regarding the detected acceleration to the to-ground wind direction-and-wind speed calculating section 253. It is to be noted that the acceleration sensor 252 generates time-series data on the acceleration, that is, generates information regarding an acceleration variation on a time axis, and outputs the information to the to-ground wind direction-and-wind speed calculating section 253.

The to-ground wind direction-and-wind speed calculating section 253 acquires the acceleration information (time-series data) inputted from the acceleration sensor 252 and calculates the movement speed and the movement direction of the mobile apparatus such as the vehicle equipped with the wind direction-and-wind speed measuring device 250.

Alternatively, the to-ground wind direction-and-wind speed calculating section 253 calculates the movement speed and the movement direction of the mobile apparatus such as the vehicle equipped with the wind direction-and-wind speed measuring device 250, on the basis of time-series data on the current position of the mobile apparatus inputted from the GNSS reception section 251.

The to-ground wind direction-and-wind speed calculating section 253 calculates the movement speed and the movement direction of the mobile apparatus such as the vehicle equipped with the wind direction-and-wind speed measuring device 250, by using at least either the information inputted from the acceleration sensor 252 or the information inputted from the GNSS reception section 251.

Moreover, the to-ground wind direction-and-wind speed calculating section 253 acquires the "data on the wind direction and the wind speed to the air" calculated by the wind direction-and-wind speed calculating section 205. On the basis of the movement speed and the movement direction of the mobile apparatus obtained by calculation based on the information inputted from the acceleration sensor 252 or the GNSS reception section 251, and on the basis of the "data on the wind direction and the wind seed to the air," the to-ground wind direction-and-wind speed calculating section 253 calculates "data on the wind direction and the wind speed to the ground," that is, "data on the wind direction and the wind speed to the ground" corresponding to the wind direction and the wind speed observed in a still state.

The correspondence between the "data on the wind direction and the wind speed to the air" and the "data on the wind direction and the wind speed to the ground" will be explained with reference to FIG. 12.

Figure 12:
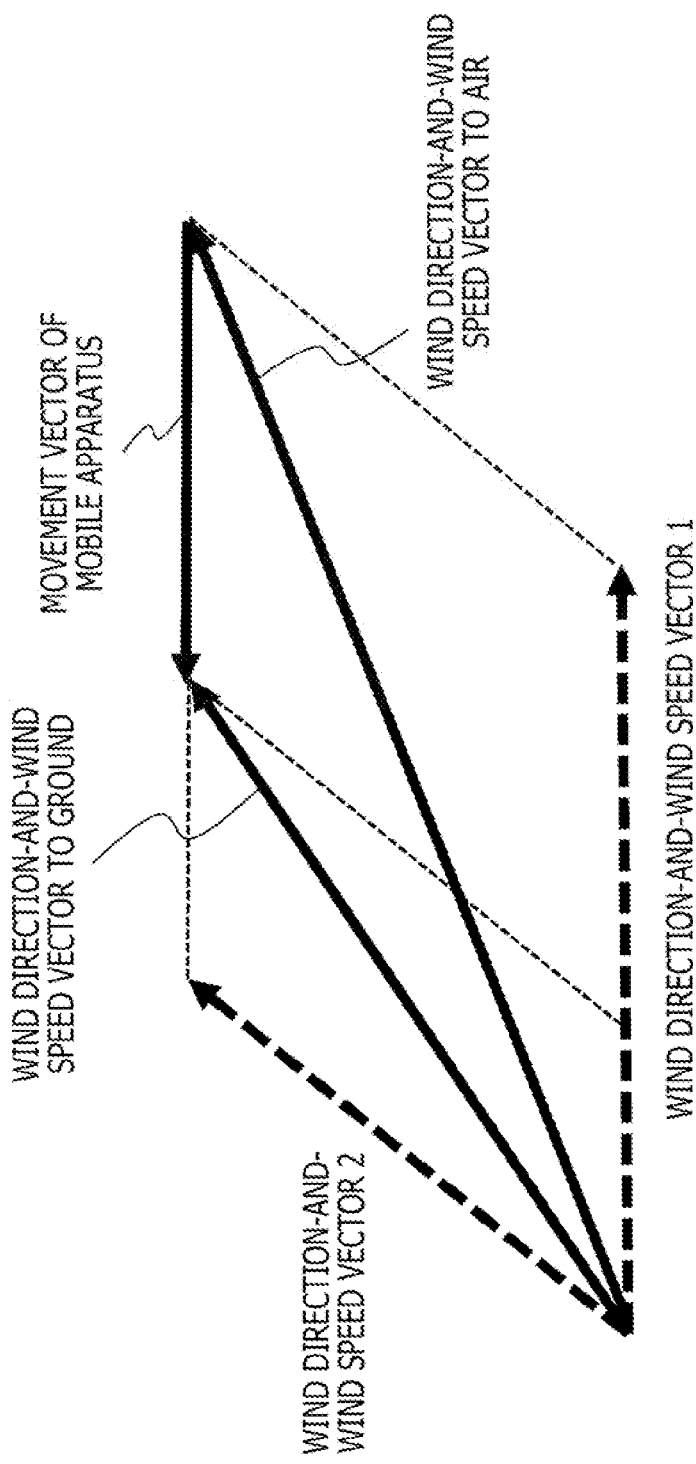
FIG. 12 is an explanatory diagram of an example of a process of measuring a wind direction and a wind speed to the ground.

FIG. 12 depicts
a wind direction-and-wind speed vector to the air,
a wind direction-and-wind speed vector to the ground, and
a movement vector of a mobile apparatus.

The length of each of the vectors represents the wind speed or the speed of the mobile apparatus. The direction of each of the vectors corresponds to the wind direction or the movement direction of the mobile apparatus.

It is to be noted that the wind direction-and-wind speed vector to the air is equivalent to a combined vector of a wind direction-and-wind speed vector 1 and a wind direction-and-wind speed vector 2, as depicted in FIG. 12.

As understood from FIG. 12, when the movement vector of the mobile apparatus is added to the wind direction-and-wind speed vector to the air, the wind direction-and-wind speed vector to the ground can be calculated.

It is to be noted that the wind direction-and-wind speed calculating section 205 of the wind direction-and-wind speed measuring device 250 depicted in FIG. 11 calculates a wind direction and a wind speed corresponding to the wind direction-and-wind speed vector to the air depicted in FIG. 12.

The to-ground wind direction-and-wind speed calculating section 253 receives the "data on the wind direction and the wind speed to the air" calculated by the wind direction-and-wind speed calculating section 205, that is, data on the wind direction and the wind speed indicated by the wind direction-and-wind speed vector to the air depicted in FIG. 12.

Furthermore, the to-ground wind direction-and-wind speed calculating section 253 calculates data on the movement direction and the movement speed with respect to a movement phase indicated by the movement vector of the mobile apparatus depicted in FIG. 12, on the basis of the movement speed and movement direction of the mobile apparatus obtained by calculation based on the information inputted from the acceleration sensor 252 or the GNSS reception section 251.

At last, the to-ground wind direction-and-wind speed calculating section 253 calculates data which the wind direction-and-wind speed vector to the ground depicted in FIG. 12 has, that is, calculates the wind direction and the wind speed in a still state, by using data included in the two vectors
the wind direction-and-wind speed vector to the air and
the movement vector of the mobile apparatus.

In the manner described so far, the wind direction-and-wind speed measuring device 250 depicted in FIG. 11 can calculate both "data on the wind direction and the wind speed to the air," which is data on a wind direction and a wind speed to which the effect of a wind according to a movement speed and a movement direction of a mobile body has been added, and "data an the wind direction and the wind speed to the ground," which is data on a wind direction and a wind speed observed in a still state.

[5. Configuration Example of Measuring Wind Direction and Wind Speed in 3D Space]

Next, a configuration example of measuring a wind direction and a wind speed in a 3D space will be explained.

The wind speed measuring device 100 which has been explained with reference to FIG. 1 can detect, by means of one acoustic wave transmitting section and one acoustic wave receiving section, a wind speed on a straight line connecting the acoustic wave transmitting section and the acoustic wave receiving section.

In addition, for example, in a case where plural acoustic wave receiving sections are disposed around one acoustic wave transmitting section, as depicted in FIG. 4 explained above, the wind direction-and-wind speed measuring device 200 which has been explained with reference to FIG. 5 can analyze not only a wind speed but also a wind direction by analyzing acoustic waves received by the respective acoustic wave receiving sections.

However, in the configuration depicted in FIG. 4, the one acoustic wave transmitting section and the plural acoustic wave receiving sections are all disposed on a single plane. With such a configuration, a wind direction and a wind speed can be detected only on plane, that is, the two-dimensional plane.

A configuration in which wind directions and wind speeds in every direction in a 3D space can be detected will explained with reference to FIG. 13.

Figure 13:
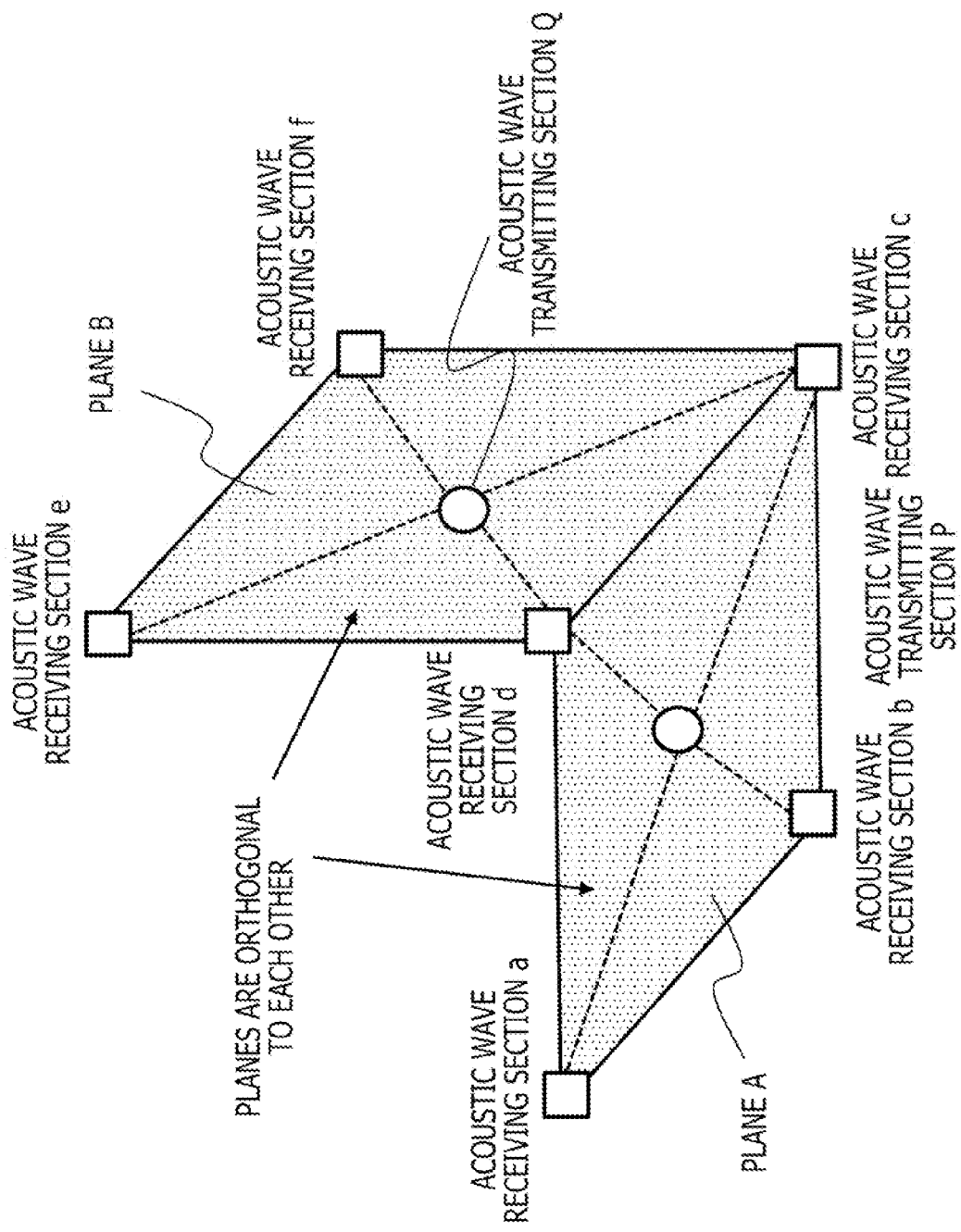
FIG. 13 is an explanatory diagram of a configuration example in which a wind direction and a wind speed can be measured in a three-dimensional (3D) space.

FIG. 13 depicts an arrangement configuration example of acoustic wave transmitting sections and acoustic wave receiving sections that are configured to be able to detect wind directions and wind speeds in every direction in a 3D space.

In this configuration, an acoustic wave transmitting section P is disposed at the center of a rectangular plane A, acoustic wave receiving sections a to d are disposed at the four vertexes of the plane A, in addition, an acoustic wave transmitting section Q is disposed at the center of a plane B that is orthogonal to the plane A, and acoustic wave receiving sections c to f are disposed at the four vertexes of the plane B.

This example corresponds to a configuration obtained by combining two sets disposed so as to be orthogonal to each other, the two sets each being obtained by providing four acoustic wave receiving sections to the wind direction-and-wind speed measuring device 200 depicted in FIG. 5 explained as the second embodiment. In the configuration depicted in FIG. 13, the two acoustic wave receiving sections c and d, which are located on the contact line of the two wind direction-and-wind speed measuring devices that are disposed so as to be orthogonal to each other, are shared.

It is to be noted that a process of transmitting an acoustic wave from the acoustic wave transmitting section P and a process of transmitting an acoustic wave from the acoustic wave transmitting section Q are performed in time division to avoid interference. Alternatively, the processes are performed by using different frequencies.

With the configuration depicted in FIG. 13, a wind direction and a wind speed on the plane A and a wind direction and a wind speed on the plane B can be separately calculated. Information regarding the two wind directions and information regarding the two wind speeds are combined so that a true wind direction and a true wind speed in the 3D space can be calculated.

Figure 14:
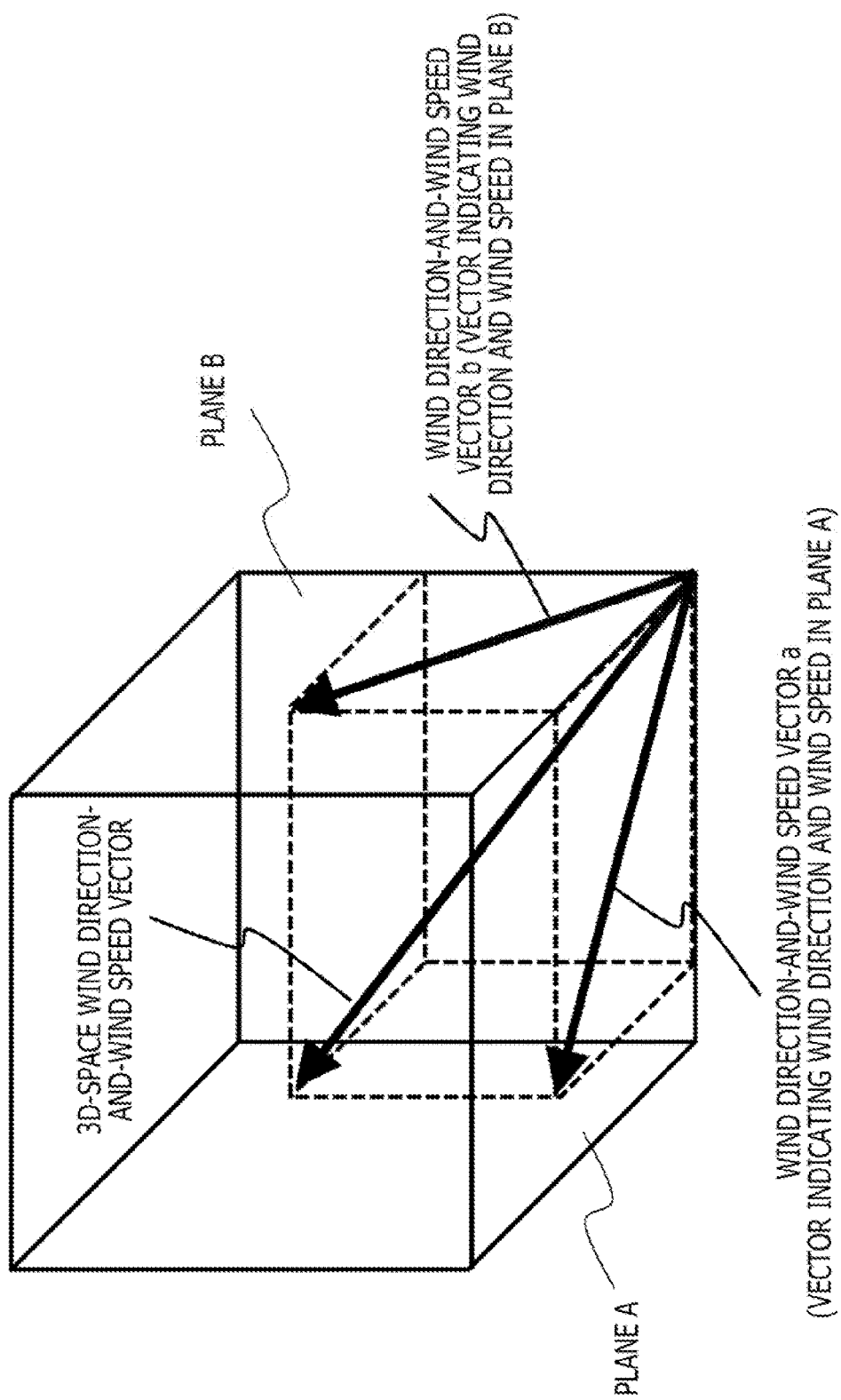
FIG. 14 is an explanatory diagram of a process of measuring a wind direction and a wind speed in a 3D space.

A specific example is depicted in FIG. 14.

A wind direction-and-wind speed vector a depicted in FIG. 14 indicates a wind direction (direction of the vector) and a wind speed (length of the vector) on the plane A.

On the other hand, a wind direction-and-wind speed vector indicates a wind direction (direction of the vector) and a wind speed (length of the vector) on the plane B.

These two vectors are combined to obtain a 3D-space wind direction-and-wind speed vector depicted in FIG. 14.

The 3D-space wind direction-and-wind speed vector indicates a true wind speed and a true wind speed in the 3D space.

In the aforementioned manner, the acoustic wave transmitting section and plural the acoustic wave receiving sections are disposed so as not to be located on a single plane. Accordingly, a wind direction-and-wind speed measuring device capable of detecting a wind direction and a wind speed in a 3D space can be realized.

[6. Hardware Configuration Example of Wind Speed Measuring Device]

Next, a hardware configuration example of the wind speed measuring device according to the present disclosure will be explained with reference to FIG. 15.

A CPU (Central Processing Unit) 301 functions as a data processing section that executes various types of processes according to a program stored in a ROM (Read Only Memory) 302 or a storage section 308. For example, the CPU 301 executes the processes following any one of the sequences explained in the aforementioned embodiments. The program or data which is executed by the CPU 301 is stored in a RAM (Random Access Memory) 303. The CPU 301, the ROM 302, and the RAM 303 are mutually connected via a bus 304.

The CPU 301 is connected to an input/output interface 305 via the bus 304. An input section 306 including various switches, a keyboard, a touch panel, a mouse, a microphone, and the like, and an output section 307 including a display, a loudspeaker, and the like are connected to the input/output interface 305.

It is to be noted that an acoustic wave receiving section, an acceleration sensor, a GNSS reception section, etc., are included in the input section 306. In addition, an acoustic wave transmitting section is included in the output section 307.

The storage section 308 connected to the input/output interface 305 includes a hard disk, for example, and stores the program which is executed by the CPU 301 and various data. A communication section 309 functions as a transmission/reception section for data communication over a network such as the internet or a local area network and communicates with an external apparatus.

A drive 310 that is connected with the input/output interface 305 drives a removable medium 311 such as a magnetic disk, an optical disk, a magneto-optical disk, or a semiconductor memory such as a memory card so that data recording or data reading is carried out.

[7. Conclusion of Configurations According to Present Disclosure]

The embodiments of the present disclosure have been explained above in detail with reference to the particular embodiments. However, it is obvious that a person skilled in the art can make modification or substitution on the embodiments within the gist of the present disclosure. That is, the present invention has been disclosed in a form of exemplifications, and thus, should not be limitedly interpreted. In order to assess the gist of the present disclosure, the claims should be considered.

It is to be noted that the technology disclosed herein also may have the following configurations.

(1)

A wind speed measuring device including:

an acoustic wave transmitting section that transmits a measurement acoustic wave;

an acoustic wave receiving section that receives the measurement acoustic wave transmitted from the acoustic wave transmitting section;

a signal selecting section that determines a characteristic of the measurement acoustic wave outputted from the acoustic wave transmitting section; and a wind speed calculating section that calculates a wind speed by analyzing a signal received by the acoustic wave receiving section, in which the signal selecting section selects, as the measurement acoustic wave outputted from the acoustic wave transmitting section, an acoustic wave that mainly includes a low-intensity frequency bandwidth selected from a noise signal which the acoustic wave receiving section receives when the measurement acoustic wave is not transmitted.

(2)
The wind speed measuring device according to (1), in which
the signal selecting section selects, as the measurement acoustic wave, an acoustic wave that mainly includes a frequency bandwidth having an intensity equal to or lower than a predetermined threshold and selected from a noise signal which the acoustic wave receiving section receives when the measurement acoustic wave is not transmitted.

(3)
The wind speed measuring device according to (2), in which
the signal selecting section sets a signal intensity of the measurement acoustic wave to an intensity that is higher than the threshold by a predetermined intensity.

(4)
The wind speed measuring device according to any one of (1) to (3), in which
the wind speed calculating section calculates a wind speed on the basis of a propagation time that is taken for the measurement acoustic wave to travel along a path from the acoustic wave transmitting section to the acoustic wave receiving section.

(5)
The wind speed measuring device according to any one of (1) to (4), in which
the wind speed calculating section calculates a wind speed on the basis of a frequency variation that occurs during a time taken for the measurement acoustic wave to travel along a path from the acoustic wave transmitting section to the acoustic wave receiving section.

(6)
The wind speed measuring device according to any one of (1) to (5), in which
the plural acoustic wave receiving sections are disposed at different relative positions with respect to the acoustic wave transmitting section, and
the wind speed calculating section functions as a wind direction-and-wind speed calculating section to calculate a wind direction as well as a wind speed by analyzing signals received by the respective plural acoustic wave receiving sections.

(7)
The wind speed measuring device according to (6), in which
the wind direction-and-wind speed calculating section
analyzes the signals received by the respective plural acoustic wave receiving sections,
calculates plural wind speeds on plural straight lines connecting the acoustic wave transmitting section to the corresponding acoustic wave receiving sections, and
calculates a wind direction on the basis of information regarding the plural calculated wind speeds in different directions.

(8)
The wind speed measuring device according to (6) or (7), in which
the wind direction-and-wind speed calculating section calculates a final wind speed and a final wind direction by combining vectors that have respective lengths designed to indicate plural wind speeds on plural straight lines connecting the acoustic wave transmitting section to the corresponding acoustic wave receiving sections.

(9)
The wind speed measuring device according to claim any one of (6) to (8), in which
the acoustic wave receiving sections are disposed at an equal distance from the acoustic wave transmitting section.

(10)
The wind speed measuring device according to (9), in which
the acoustic wave receiving sections are disposed such that an equal space is provided between the adjacent acoustic wave receiving sections.

(11)
The wind speed measuring device according to any one of (6) to (10), further including:
a to-ground wind direction-and-wind speed calculating section that calculates to-ground wind direction-and-wind speed information which indicates a wind direction and a wind speed in a still state, in which
the to-ground wind direction-and-wind speed calculating section
receives to-air wind direction-and-wind speed information which indicates a wind direction and a wind speed which are calculated by the wind direction-and-wind speed calculating section of the wind speed measuring device mounted on a mobile apparatus and which include an effect of wind caused by movement of the mobile apparatus, and
calculates the to-ground wind direction-and-wind speed information by using the to-air wind direction-and-wind speed information and information regarding a movement speed and a movement direction of the mobile apparatus.

(12)
The wind speed measuring device according to (11), in which
the to-ground wind direction-and-wind speed calculating section calculates the movement speed and the movement direction of the mobile apparatus by using current position information inputted from a GNSS reception section mounted on the mobile apparatus or acceleration information inputted from an acceleration sensor.

(13)
The wind speed measuring device according to any one of (1) to (12), in which
the plural acoustic wave receiving sections are disposed at different relative positions with respect to the acoustic wave transmitting section,
the acoustic wave transmitting section and the plural acoustic wave receiving sections are disposed so as not to form a single plane, and
the wind speed calculating section functions as a wind direction-and-wind speed calculating section to calculate a wind speed and a wind direction in a three-dimensional space by analyzing signals received by the respective plural acoustic wave receiving sections.

(14)
The wind speed measuring device according to (13), in which
plural sets each including one acoustic wave transmitting section and plural acoustic wave receiving sections that are disposed on a single plane are combined such that the sets are designed not in parallel with one another.

(15)
The wind speed measuring device according to (13) or (14), in which
the wind speed measuring device has a configuration obtained by combining sets each including one acoustic wave transmitting section and plural acoustic wave receiving sections that are disposed on a single plane such that the sets are orthogonal to each other.

(16)

A wind speed measuring method which is executed by a wind speed measuring device, the method including:

a signal selecting step in which a signal selecting section determines a characteristic of a measurement acoustic wave outputted from an acoustic wave transmitting section;

a step in which the acoustic wave transmitting section transmits the measurement acoustic wave;

a step in which an acoustic wave receiving section receives the measurement acoustic wave transmitted from the acoustic wave transmitting section; and a step in which a wind speed calculating section calculates a wind speed by analyzing a signal received by the acoustic wave receiving section, in which in the signal selecting step, an acoustic wave is selected as the measurement acoustic wave outputted from the acoustic wave transmitting section, the acoustic wave mainly including a low-intensity frequency bandwidth selected from a noise signal which the acoustic wave receiving section receives when the measurement acoustic wave is not transmitted.

(17)

A program for causing a wind speed measuring device to execute a wind speed measuring process, the program being configured to cause the wind speed measuring device to execute:

a signal selecting step of causing a signal selecting section to determine a characteristic of a measurement acoustic wave outputted from an acoustic wave transmitting section;

a step of causing the acoustic wave transmitting section to transmit the measurement acoustic wave;

a step of causing an acoustic wave receiving section to receive the measurement acoustic wave transmitted from the acoustic wave transmitting section; and a step of causing a wind speed calculating section to calculate a wind speed by analyzing a signal received by the acoustic wave receiving section, in which in the signal selecting step, an acoustic wave is selected as the measurement acoustic wave outputted from the acoustic wave transmitting section, the acoustic wave mainly including a low-intensity frequency bandwidth selected from a noise signal which the acoustic wave receiving section receives when the measurement acoustic wave is not transmitted.

Further, a series of the processes explained herein can be executed by hardware, software, or a complex configuration thereof. In a case where the processes are executed by software, a program having a sequence of the processes recorded therein can be executed after being installed into a memory of a computer incorporated in dedicated hardware, or can be executed after being installed into a general-purpose computer capable of various processes. For example, such a program may be previously recorded in a recording medium. The program can be installed into the computer from the recording medium. Alternatively, the program can be received over a network such as a LAN (Local Area Network) or the internet and be installed into a recording medium such as an internal hard disk.

It is to be noted that the processes described herein are not necessarily executed in the described time-series order, and the processes may be executed parallelly or separately, as needed or according to the processing capacity of a device to execute the processes. Further, in the present description, a system refers to a logical set configuration including plural devices, and the devices in the configuration are not necessarily included in the same casing.

INDUSTRIAL APPLICABILITY

As explained so far, a device capable of measuring a wind speed and a wind direction with high precision while reducing the effect of ambient noise can be realized according to the configuration of one embodiment of the present disclosure.

Specifically, for example, the device includes an acoustic wave transmitting section that transmits a measurement acoustic wave, an acoustic wave receiving section that receives the measurement acoustic wave transmitted from the acoustic wave transmitting section, a signal selecting section that determines a measurement acoustic wave characteristic, and a wind speed calculating section that calculates a wind speed by analyzing a signal received by the acoustic wave receiving section. The signal selecting section selects, as the measurement acoustic wave, an acoustic wave that mainly includes a low-intensity frequency bandwidth selected from a noise signal which the acoustic wave receiving section receives when the measurement acoustic wave is not transmitted. Alternatively, the plural acoustic wave receiving sections are disposed at different relative positions with respect to the acoustic wave transmitting section, and the wind speed calculating section functions as a wind direction-and-wind speed calculating section to calculate a wind direction as well as a wind speed by analyzing signals received by the respective plural acoustic wave receiving sections.

With the present configuration, a device capable of measuring a wind speed and a wind direction with high precision while reducing the effect of ambient noise can be realized.

REFERENCE SIGNS LIST

100 Wind speed measuring device
101 Control section
102 Acoustic wave receiving section
103 Signal analyzing section
104 Propagation time measuring section
105 Wind speed calculating section
106 Signal selecting section
107 Acoustic wave generating section
108 Acoustic wave transmitting section
200 Wind direction-and-wind speed measuring device
201 Control section
202 Acoustic wave receiving section
203 Signal analyzing section
204 Propagation time measuring section
205 Wind direction-and-wind speed calculating section
206 Signal selecting section
207 Acoustic wave generating section
208 Acoustic wave transmitting section
230 Vehicle
250 Wind direction-and-wind speed measuring device
251 GNSS reception section
252 Acceleration sensor
253 To-ground wind direction-and-wind speed calculating section
301 CPU
302 ROM
303 RAM
304 Bus
305 Input/output interface
306 Input section 307 Output section
308 Storage section
309 Communication section
310 Drive
311 Removable medium

The invention claimed is:

1. A wind speed measuring device, comprising:
an acoustic wave transmitting section configured to transmit a measurement acoustic wave;
an acoustic wave receiving section configured to receive the measurement acoustic wave transmitted from the acoustic wave transmitting section;
a signal selecting section configured to determine a characteristic of the measurement acoustic wave outputted from the acoustic wave transmitting section; and
a wind speed calculating section configured to calculate a wind speed by analyzing a signal received by the acoustic wave receiving section, wherein
the signal selecting section is configured to select, as the measurement acoustic wave outputted from the acoustic wave transmitting section, a first acoustic wave that includes a low-intensity frequency bandwidth selected from a noise signal which the acoustic wave receiving section receives when the measurement acoustic wave is not transmitted.

2. The wind speed measuring device according to claim 1, wherein
the signal selecting section is configured to select, as the measurement acoustic wave, a second acoustic wave that includes a frequency bandwidth having an intensity equal to or lower than a predetermined threshold and selected from the noise signal which the acoustic wave receiving section receives when the measurement acoustic wave is not transmitted.

3. The wind speed measuring device according to claim 2, wherein
the signal selecting section is configured to set a signal intensity of the measurement acoustic wave to an intensity that is higher than the predetermined threshold by a predetermined intensity.

4. The wind speed measuring device according to claim 1, wherein
the wind speed calculating section is configured to calculate a wind speed based on a propagation time that is taken for the measurement acoustic wave to travel along a path from the acoustic wave transmitting section to the acoustic wave receiving section.

5. The wind speed measuring device according to claim 1, wherein
the wind speed calculating section is configured to calculate a wind speed based on a frequency variation that occurs during a time taken for the measurement acoustic wave to travel along a path from the acoustic wave transmitting section to the acoustic wave receiving section.

6. The wind speed measuring device according to claim 1, wherein
a plural acoustic wave receiving sections are disposed at different relative positions with respect to the acoustic wave transmitting section, and
the wind speed calculating section is configured to function as a wind direction-and-wind speed calculating section to calculate a wind direction as well as a wind speed by analyzing signals received by the respective plural acoustic wave receiving sections.

7. The wind speed measuring device according to claim 6, wherein
the wind direction-and-wind speed calculating section is configured to:
analyze the signals received by the respective plural acoustic wave receiving sections,
calculate plural wind speeds on plural straight lines connecting the acoustic wave transmitting section to the corresponding plural acoustic wave receiving sections, and
calculate a wind direction based on information regarding the calculated plural wind speeds in different directions.

8. The wind speed measuring device according to claim 6, wherein
the wind direction-and-wind speed calculating section is configured to calculate a final wind speed and a final wind direction by combining vectors that have respective lengths designed to indicate plural wind speeds on plural straight lines connecting the acoustic wave transmitting section to the corresponding plural acoustic wave receiving sections.

9. The wind speed measuring device according to claim 6, wherein
the plural acoustic wave receiving sections are disposed at an equal distance from the acoustic wave transmitting section.

10. The wind speed measuring device according to claim 9, wherein
the plural acoustic wave receiving sections are disposed such that an equal space is provided between adjacent acoustic wave receiving sections.

11. The wind speed measuring device according to claim 6, further comprising:
a to-ground wind direction-and-wind speed calculating section configured to calculate to-ground wind direction-and-wind speed information which indicates a wind direction and a wind speed in a still state, wherein
the to-ground wind direction-and-wind speed calculating section is configured to:
receive to-air wind direction-and-wind speed information which indicates a wind direction and a wind speed which are calculated by the wind direction-and-wind speed calculating section of the wind speed measuring device mounted on a mobile apparatus and which include an effect of wind caused by movement of the mobile apparatus, and
calculate the to-ground wind direction-and-wind speed information by using the to-air wind direction-and-wind speed information and information regarding a movement speed and a movement direction of the mobile apparatus.

12. The wind speed measuring device according to claim 11, wherein
the to-ground wind direction-and-wind speed calculating section is configured to calculate the movement speed and the movement direction of the mobile apparatus by using current position information inputted from a Global Navigation Satellite System (GNSS) reception section mounted on the mobile apparatus or acceleration information inputted from an acceleration sensor.

13. The wind speed measuring device according to claim 1, wherein
a plural acoustic wave receiving sections are disposed at different relative positions with respect to the acoustic wave transmitting section, the acoustic wave transmitting section and the plural acoustic wave receiving sections are disposed so as not to form a single plane, and the wind speed calculating section configured to function as a wind direction-and-wind speed calculating section to calculate a wind speed and a wind direction in a three-dimensional space by analyzing signals received by the respective plural acoustic wave receiving sections.

14. The wind speed measuring device according to claim 13, wherein plural sets each including one acoustic wave transmitting section and plural acoustic wave receiving sections that are disposed on a single plane are combined such that the sets are designed not in parallel with one another.

15. The wind speed measuring device according to claim 13, wherein the wind speed measuring device has a configuration obtained by combining sets each including one acoustic wave transmitting section and plural acoustic wave receiving sections that are disposed on a single plane such that the sets are orthogonal to each other.

16. A wind speed measuring method which is executed by a wind speed measuring device, the method comprising:

determining, by a signal selecting section, a characteristic of a measurement acoustic wave outputted from an acoustic wave transmitting section;

transmitting, by the acoustic wave transmitting section, the measurement acoustic wave;

receiving, by an acoustic wave receiving section, the measurement acoustic wave transmitted from the acoustic wave transmitting section; and calculating, by a wind speed calculating section, a wind speed by analyzing a signal received by the acoustic wave receiving section, wherein an acoustic wave including a low-intensity frequency bandwidth is selected, as the measurement acoustic wave outputted from the acoustic wave transmitting section, from a noise signal which the acoustic wave receiving section receives when the measurement acoustic wave is not transmitted.

17. A non-transitory computer-readable medium having stored thereon, computer-executable instructions that when executed by a computer, causes the computer to execute operations for causing a wind measuring device to perform a wind speed measuring process, the operations comprising:

determining, by a signal selecting section, a characteristic of a measurement acoustic wave outputted from an acoustic wave transmitting section;

transmitting, by the acoustic wave transmitting section, the measurement acoustic wave;

receiving, by an acoustic wave receiving section, the measurement acoustic wave transmitted from the acoustic wave transmitting section; and calculating, by a wind speed calculating section, a wind speed by analyzing a signal received by the acoustic wave receiving section, wherein an acoustic wave including a low-intensity frequency bandwidth is selected, as the measurement acoustic wave outputted from the acoustic wave transmitting section, from a noise signal which the acoustic wave receiving section receives when the measurement acoustic wave is not transmitted.

* * * * *